United States Patent
Inagaki

(10) Patent No.: US 9,190,905 B2
(45) Date of Patent: Nov. 17, 2015

(54) SWITCHING POWER SUPPLY DEVICE FOR NOISE REDUCTION

(75) Inventor: Ryosuke Inagaki, Kyoto (JP)

(73) Assignee: ROHM CO., LTD. (JP)

( * ) Notice: Subject to any disclaimer, the term of this patent is extended or adjusted under 35 U.S.C. 154(b) by 13 days.

(21) Appl. No.: 13/371,856

(22) Filed: Feb. 13, 2012

(65) Prior Publication Data

US 2013/0271096 A1    Oct. 17, 2013

(30) Foreign Application Priority Data

Feb. 14, 2011   (JP) .................................. 2011-028674

(51) Int. Cl.
*H02M 3/156*   (2006.01)
*H02M 1/44*    (2007.01)
*H02M 3/158*   (2006.01)

(52) U.S. Cl.
CPC ................ *H02M 3/156* (2013.01); *H02M 1/44* (2013.01); *H02M 3/158* (2013.01)

(58) Field of Classification Search
CPC ........ H02M 3/156; H02M 3/158; H02M 1/44
USPC ......... 323/266, 222, 282, 283, 284, 285, 272, 323/351, 240, 247, 251, 255, 259, 290, 223, 323/225, 268, 271, 345; 363/89, 90
See application file for complete search history.

(56) References Cited

U.S. PATENT DOCUMENTS

| 6,002,603 A | * | 12/1999 | Carver | 363/98 |
| 6,239,584 B1 | * | 5/2001 | Jang et al. | 323/222 |
| 2005/0168073 A1 | * | 8/2005 | Hjort | 307/65 |
| 2006/0208832 A1 | * | 9/2006 | Kamata et al. | 333/174 |
| 2007/0228837 A1 | * | 10/2007 | Nielsen et al. | 307/82 |
| 2008/0061628 A1 | * | 3/2008 | Nielsen et al. | 307/66 |
| 2010/0202158 A1 | * | 8/2010 | Cheung | 363/15 |

FOREIGN PATENT DOCUMENTS

| JP | 2010-28951 A | 2/2010 |
| JP | 2010-283972 A | 12/2010 |

* cited by examiner

*Primary Examiner* — Fred E Finch, III
*Assistant Examiner* — Gustavo Rosario Benitez
(74) *Attorney, Agent, or Firm* — Cantor Colburn LLP

(57) ABSTRACT

A switching power supply device includes: a positive voltage output circuit connected to a direct-current power supply, the positive voltage output circuit including a first switching element, a voltage boosting inductor, a first rectifying element and a first capacitor; a negative voltage output circuit connected to the power supply, the negative voltage output circuit including a second switching element, a voltage dropping inductor, a second rectifying element and a second capacitor; and an adder circuit configured to add switching currents flowing when the first and the second switching elements are operated. The circuit elements of the positive voltage output circuit are symmetrical with those of the negative voltage output circuit. The first switching current of the positive voltage output circuit and the second switching current of the negative voltage output circuit are generated in mutually opposite directions and are inputted to the adder circuit.

15 Claims, 33 Drawing Sheets

SWITCHING POWER SUPPLY DEVICE FOR NOISE REDUCTION

CROSS-REFERENCE TO RELATED APPLICATION

This application is based upon and claims the benefit of priority from Japanese Patent Application No. 2011-028674, filed on Feb. 14, 2011, the entire contents of which are incorporated herein by reference.

TECHNICAL FIELD

The present disclosure relates to a switching power supply device having a noise reduction function.

BACKGROUND

A switching power supply device of the related art has a configuration in which a pulse voltage is generated from an input voltage by a switching operation and an output voltage is obtained by smoothing the pulse voltage. In the switching power supply device, it is possible to obtain a desired positive voltage and a desired negative voltage. The efficiency of the obtained voltages is as high as 80% to 95%. Thus, the switching power supply device is superior from the viewpoint of power-saving design.

However, if a wireless communication unit for processing ultra-micro signals, such as Bluetooth, GPS (Global Positioning system) or WLAN (Wireless Local Area Network), exists in the vicinity of the switching power supply, communication is hindered by even a small amount of noise. This makes it impossible to perform basic operations, thereby causing a malfunction. Major causes of this phenomenon include PI (Power Integrity) noise, EMI (Electromagnetic Interference) and emission noise of the switching power supply.

In the related art, therefore, the switching power supply is used in equipment having no wireless communication unit. If a communication unit exists near the switching power supply, a filter or a choke coil for reducing PI noise or EMI noise is arranged in addition to the switching power supply. It is also known that the switching power supply is wholly surrounded by a tube shield to prevent the influence of a switching noise. In the related art, a noise-cancelling dummy switch is provided to cancel the electric fields between an output-voltage-generating switch node and a noise-cancelling switch node.

In the related art referred to above, however, the costs grow higher. Moreover, the substrate area, the volume and weight of the parts, the number of parts and the reliability work against the switching power supply and become an obstacle in designing a small, lightweight and high-performance product. In addition, the methods of the related art, such as the method of providing a filter or a choke coil for reducing PI noise or EMI noise in addition to the switching power supply, suffer from a problem in that it is difficult to sufficiently reduce noise. In order to obtain a positive voltage output and a negative voltage output, there is a need to separately provide a voltage boosting circuit and a voltage dropping circuit. If the noise-reducing parts stated above are added to the voltage boosting circuit and the voltage dropping circuit, the costs grow higher. The addition of the noise-reducing parts becomes an obstacle in designing a small, lightweight and high-performance product.

SUMMARY

The present disclosure provides some embodiments of a switching power supply device capable of solving the problems noted above, capable of accurately reducing noises with a simple configuration without having to reduce noises through the use of special parts such as a filter, a choke coil, a tube shield and a dummy switch and capable of efficiently obtaining a desired output voltage regardless of whether the output voltage is positive or negative.

According to one embodiment of the present disclosure, there is provided a switching power supply device, including: a positive voltage output circuit connected to a direct-current power supply, the positive voltage output circuit including a first switching element, a voltage boosting inductor, a first rectifying element and a first capacitor; a negative voltage output circuit connected to the direct-current power supply, the negative voltage output circuit including a second switching element, a voltage dropping inductor, a second rectifying element and a second capacitor; and an adder circuit configured to add switching currents flowing when the first switching element and the second switching element are operated, the first switching element, the voltage boosting inductor, the first rectifying element and the first capacitor of the positive voltage output circuit being symmetrical in arrangement with the second switching element, the voltage dropping inductor, the second rectifying element and the second capacitor of the negative voltage output circuit, and the positive voltage output circuit configured to generate a first switching current and the negative voltage output circuit configured to generate a second switching current, wherein the first switching current of the positive voltage output circuit and the second switching current of the negative voltage output circuit are generated in mutually opposite directions and inputted to the adder circuit.

DETAILED DESCRIPTION

Figure 1:
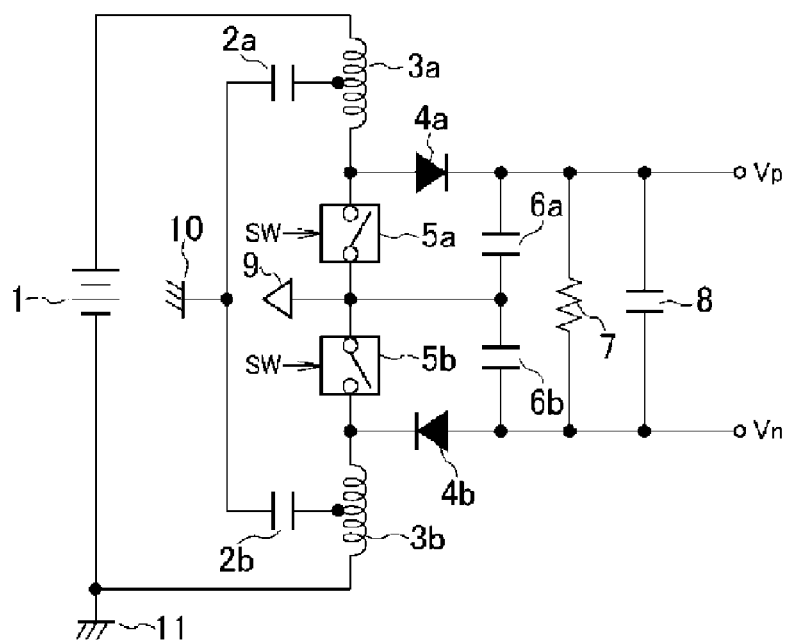
FIG. 1 is a circuit diagram showing one configuration example of a switching power supply circuit of the present disclosure.

An embodiment of the present disclosure will now be described with reference to the drawings. In the following description on the drawings, identical or similar parts will be designated by identical or similar reference symbols. The drawings are schematic ones. It is sometimes the case that parts differing in dimension and ratio from one another are included in the drawings.

Figure 6:
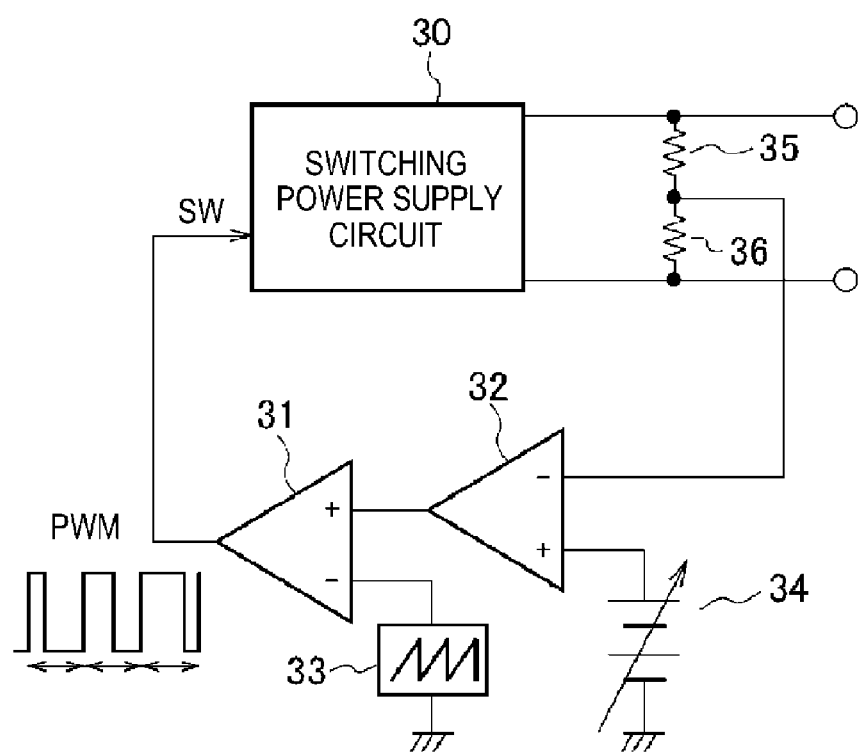
FIG. 6 is a block diagram showing an overall configuration example of a switching power supply device of the present disclosure.

A switching power supply device can be configured as shown in FIG. 6 which shows an overall configuration example of the switching power supply device. A boosted or dropped voltage is outputted from a switching power supply circuit 30 according to the present embodiment. In order to change the voltage thus outputted, there are provided a comparator 31, a differential amplifier 32, a triangular wave generator 33, a reference voltage generator 34 and voltage dividing resistors 35 and 36.

The output voltage of the switching power supply circuit 30 is divided by the voltage dividing resistors 35 and 36 and is inputted to one terminal of the differential amplifier 32. The voltage dividing resistors 35 and 36 are configured to have, e.g., the same resistance value. In addition, a reference voltage is supplied from the reference voltage generator 34 to the other terminal of the differential amplifier 32.

The differential voltage between the reference voltage and the divided voltage is amplified in the differential amplifier 32. The amplified differential voltage is inputted to the comparator 31 and is used as a threshold value of a triangular wave generated from the triangular wave generator 33. The pulse width of a pulse signal SW outputted from the comparator 31 varies depending on the magnitude of the threshold value. In other words, the pulse signal SW is a PWM (Pulse Width Modulation) signal. Accordingly, the magnitude of the threshold value inputted to the comparator 31 can be varied by varying the reference voltage of the reference voltage generator 34. The output voltage can be varied by varying the pulse signal SW to a switching element of the switching power supply circuit 30.

The switching power supply circuit 30 as a basic component part of the switching power supply device of the present embodiment can be configured, for example, as shown in FIG. 1. An inductor 3a is connected to a positive electrode of a direct-current power supply 1 (VDD) with an inductor 3b connected to a negative electrode of the direct-current power supply 1. The negative electrode of the direct-current power supply 1 and one end of the inductor 3b are grounded. The inductors 3a and 3b are identical in inductance and property with each other. In the following description, capacitors 2a and 2b are identical in capacitance and property with each other. So are capacitors 6a and 6b. Likewise, diodes 4a and 4b are identical in property with each other as are switches 5a and 5b.

The inductors 3a and 3b are formed of center-tap inductors. If the center-tap inductors are employed in this manner, it is only necessary to add one connection terminal, and thus the volume and weight of the inductor 3a or 3b remain substantially unchanged as compared with a single inductor. Needless to say, two independent inductors may be connected in series. The inductor 3a is a voltage boosting inductor and the inductor 3b is a voltage dropping inductor.

The capacitor 2a is provided between the center of the inductor 3a and a grounding point 10 (VSS) and the capacitor 2b is provided between the center of the inductor 3b and the grounding point 10. The other end of the inductor 3a connected to the positive electrode of the direct-current power supply 1 is connected to the switch 5a as a switching element and an anode of the diode 4a as a rectifying element. The other end of the switch 5a is connected to a common line 9.

The common line 9 is biased to one half of the power supply voltage VDD of the direct-current power supply 1. The cathode of the diode 4a is connected to the capacitor 6a. The other end of the capacitor 6a is connected to the common line 9.

The other end of the inductor 3b connected to the negative electrode of the direct-current power supply 1 is connected to the switch 5b as a switching element and a cathode of the diode 4b as a rectifying element. The other end of the switch 5b is connected to the common line 9. The anode of the diode 4b is connected to the capacitor 6b. The other end of the capacitor 6b is connected to the common line 9.

A pulse signal SW as a switching control signal is inputted to the switch 5a and the switch 5b.

In this regard, the inductor 3a, the switch 5a, the diode 4a and the capacitor 6a make up a positive voltage output circuit. The positive voltage output circuit serves as a voltage boosting circuit. On the other hand, the inductor 3b, the switch 5b, the diode 4b and the capacitor 6b make up a negative voltage output circuit. The negative voltage output circuit serves as a voltage dropping circuit. The capacitor 2a, the capacitor 2b and the grounding point 10 as a junction of the capacitors 2a and 2b makes up an adder circuit. As is apparent from the above, the positive voltage output circuit and the negative voltage output circuit differ in the connecting directions of the diode 4a and the diode 4b from each other due to the difference in function, i.e., the difference between the voltage boosting circuit and the voltage dropping circuit. However, the arrangement or connection of circuit elements is symmetrical in the positive voltage output circuit and the negative voltage output circuit.

The operating points of the positive voltage output circuit and the negative voltage output circuit are kept at voltage VDD/2 by maintaining the common line 9 at the voltage VDD/2.

The adder circuit serves to add the mutually opposite switching currents generated through the switches 5a and 5b when the switches 5a and 5b are operated by the pulse signal SW. The switching currents are caused to flow through the capacitors 2a and 2b so that direct current components can be removed from the switching currents. This makes it possible to extract high-frequency switching noise currents and to add high-frequency switching noise currents.

A resistor 7 is provided parallel to the capacitors 6a and 6b between the cathode of the diode 4a and the anode of the diode 4b. A capacitor 8 is provided parallel to the resistor 7. The resistor 7 is a load resistor and the capacitor 8 is a smoothing capacitor.

During the voltage boosting and dropping operation of the switching power supply circuit 30, it is typical that the current flowing through the inductors 3a and 3b between the direct-current power supply 1 (VDD) and the grounding point 10 (VSS) is switched by the switches 5a and 5b.

During the time when the switches 5a and 5b are closed under the control of the pulse signal SW, an electric current flows through the inductor 3a, the switch 5a, the switch 5b and the inductor 3b. If the switches 5a and 5b are opened under the control of the pulse signal SW, the electric current flowing thus far is abruptly stopped. Therefore, large induction voltages (counter electromotive forces) are generated between the opposite ends of the inductor 3a and between the opposite ends of the inductor 3b.

The operating point of the switching power supply circuit 30 is kept at the voltage VDD/2 as stated above. In the positive voltage output circuit, the voltage VDD/2 and the induction voltage generated by the inductor 3a have the same polarity. Therefore, an electric current corresponding to the added voltage of the voltage VDD/2 and the induction voltage generated by the inductor 3a flows through the diode 4a. The summed voltage of the voltage VDD/2 and the induction voltage generated by the inductor 3a is charged to the capacitor 6a.

In the negative voltage output circuit, the voltage VDD/2 and the induction voltage generated by the inductor 3b have the reverse polarities. Therefore, an electric current corresponding to the differential voltage between the voltage VDD/2 and the induction voltage generated by the inductor 3b flows through the diode 4b. The differential voltage between the voltage VDD/2 and the induction voltage generated by the inductor 3b is charged to the capacitor 6b.

During the switching operation set forth above, an electric current of the order of amperes flows momentarily through the direct-current power supply 1, thereby generating a PI noise or an EMI noise. These noises can be attenuated to a certain level through the use of an external filter or choke coil (not shown). It is however difficult to reduce the noises to such a level at which of her blocks are not damaged.

In the present embodiment, the operating point of the switching power supply circuit 30 is kept at one half of the voltage VDD of the direct-current power supply 1, whereby a boosted voltage and a dropped voltage symmetrically distributed at the positive side and the negative side, respectively, with respect to the voltage VDD/2 can be obtained from the single direct-current power supply 1. If the circuit characteristics at the boosted voltage side and the dropped voltage side are symmetrical, there exists a difference in the DC level. However, the generated PI and EMI noises differ only in the polarities from each other and have the same magnitude.

In the adder circuit, a switching current is extracted from the middle point of the inductor 3a and is led to the grounding point 10 through the capacitor 2a. In addition, a switching current is extracted from the middle point of the inductor 3b and is led to the grounding point 10 through the capacitor 2b. In this manner, the high-frequency noise components of the switching currents flowing through the switches 5a and 5b are generated in mutually opposite directions and are added in the adder circuit.

Accordingly, the noises can be logically eliminated in quite an accurate manner by adding the noises after removing the direct current components through the use of the capacitor. While the inductor 3a is a voltage boosting inductor, it also plays the role of a smoothing inductor. Likewise, while the inductor 3b is a voltage dropping inductor, it also plays the role of a smoothing inductor. In other words, there is provided a configuration in which the noises are further reduced by using the inductor 3a and the capacitor 2a as a T-type LC filter and using the inductor 3b and the capacitor 2b as a T-type LC filter.

The capacitors 6a and 6b for holding the switching currents are connected to the voltage VDD/2. The voltage and current of the respective parts can be represented by simple numerical formulas:

$$\text{Boosted Voltage } Vp = VDD/2 + VC1 \quad (1),$$

where VC1 denotes the voltage applied between the opposite ends of the capacitor 6a;

$$\text{Dropped Voltage } Vn = VDD/2 - VC2 \quad (2),$$

where VC2 denotes the voltage applied between the opposite ends of the capacitor 6b; and $$\text{Load Current } IL = (Vp - Vn)/R \quad (3),$$

where R denotes the resistance value of the resistor 7.

As can be noted from the above, it is possible to extract a positive voltage output Vp and a negative voltage output Vn from the switching power supply circuit 30 shown in FIG. 1.

Since the current Isw1 flowing through the switch 5a is equal to the current Isw2 flowing through the switch 5b, the absolute value of the switching noise current IN1 becomes equal to the absolute value of the switching noise current IN2, where IN1 signifies the current flowing toward the grounding point 10 (VSS) through the capacitor 2a and IN2 stands for the current flowing toward the grounding point 10 (VSS) through the capacitor 2b.

Figure 2:
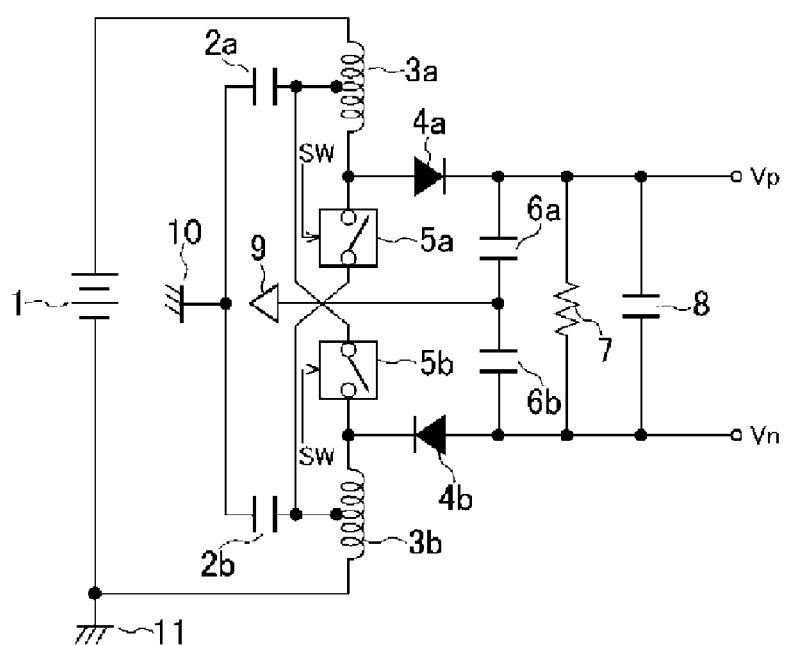
FIG. 2 is a circuit diagram showing another configuration example of the switching power supply circuit of the present disclosure.

In the configuration example shown in FIG. 1, the boosting and dropping amounts of the output voltage remain small. Only the differential voltage between the voltage VDD of the direct-current power supply 1 and the voltage VDD/2 of the operating point is applied to the inductors 3a and 3b. For that reason, the current flowing through the inductors 3a and 3b is not very large. Accordingly, the induction voltages generated in the inductors 3a and 3b do not grow larger and the boosting and dropping amounts of the output voltage become smaller. FIG. 2 shows a configuration in which the output voltage can be boosted and dropped in a larger amount than in the configuration example shown in FIG. 1. The configuration shown in FIG. 2 is essentially the same as that illustrated in FIG. 1, except the change in the connection of the switches 5a and 5b.

The same circuit elements as those shown in FIG. 1 are designated by like reference symbols with no description made thereon. Unlike the configuration shown in FIG. 1, the opposite side of the switch 5a from the connection point between the switch 5a and the inductor 3a is connected to the midpoint of the inductor 3b in the configuration shown in FIG. 2. The opposite side of the switch 5b from the connection point between the switch 5b and the inductor 3b is connected to the midpoint of the inductor 3a. While the switches 5a and 5b are serially connected to the direct-current power supply 1 in FIG. 1, the switches 5a and 5b are connected in parallel to the direct-current power supply 1 in FIG. 2.

With this configuration, the voltage VDD of the direct-current power supply 1 is directly applied to the inductors 3a and 3b. Thus, the current flowing through the inductors 3a and 3b becomes larger. As a result, the induction voltage generated in the inductors 3a and 3b grows larger, thereby making the boosting and dropping amount of the output voltage larger.

Figure 3:
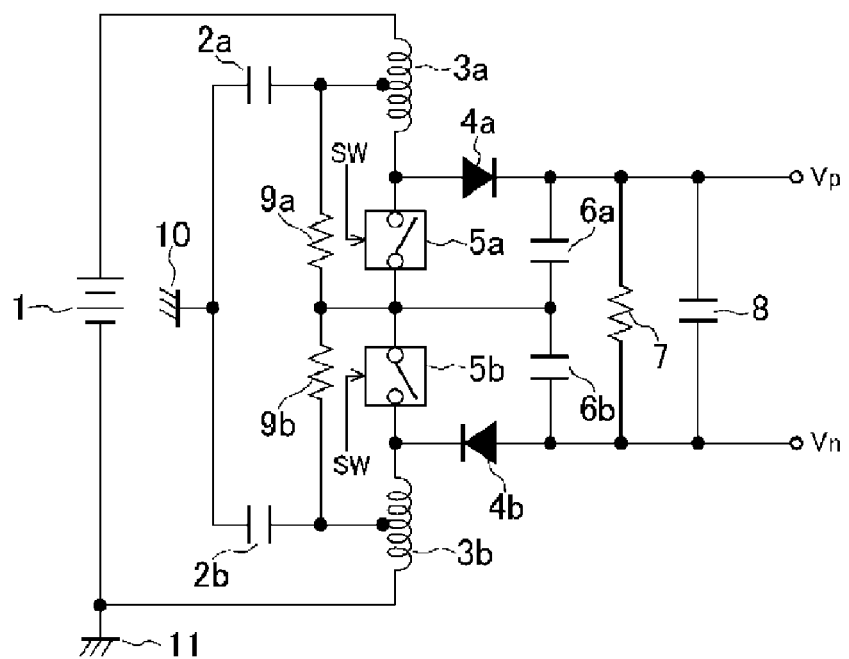
FIG. 3 is a circuit diagram showing a further configuration example of the switching power supply circuit of the present disclosure.

FIG. 3 shows a switching power supply circuit in which the method of generating the voltage VDD/2 at the operating point is changed. The same circuit elements as those shown in FIG. 1 are designated by like reference symbols with no description made thereon. The switching power supply circuit shown in FIG. 3 differs from the switching power supply circuit shown in FIG. 1 in that the bias voltage VDD/2 is not applied to the common line 9 and that the voltage VDD of the direct-current power supply 1 is divided by resistors 9a and 9b. The resistors 9a and 9b have the same resistance value and the same characteristics. Thus, the voltage at the connection point of the resistors 9a and 9b becomes equal to VDD/2. Likewise, the voltage at the operating point of the switching power supply circuit becomes equal to VDD/2.

Figure 4:
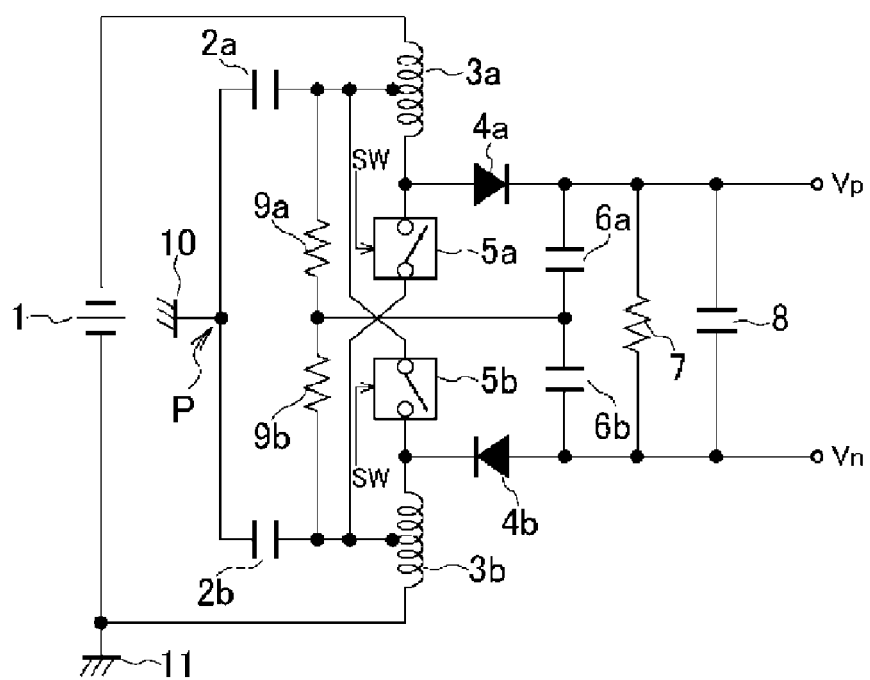
FIG. 4 is a circuit diagram showing still a further configuration example of the switching power supply circuit of the present disclosure.

FIG. 4 shows a switching power supply circuit in which the boosting and dropping amounts of the output voltage are made greater than those of the switching power supply circuit shown in FIG. 3. The same circuit elements as those shown in FIGS. 1 and 3 are designated by like reference symbols with no description made thereon. The connection of the switches 5a and 5b differs from that of the configuration shown in FIG. 3. The opposite side of the switch 5a from the connection point between the switch 5a and the inductor 3a is connected to the midpoint of the inductor 3b. The opposite side of the switch 5b from the connection point between the switch 5b and the inductor 3b is connected to the midpoint of the inductor 3a.

With this configuration, as described with respect to FIG. 2, the voltage VDD of the direct-current power supply 1 is directly applied to the inductors 3a and 3b. Thus, the boosting and dropping amounts of the output voltage become larger.

Figure 5:
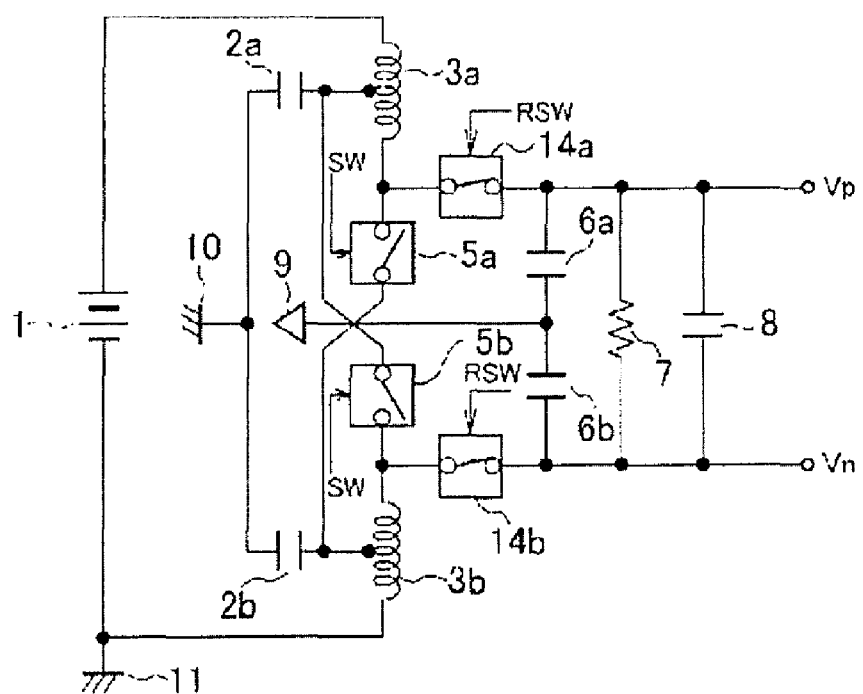
FIG. 5 is a circuit diagram showing yet still a further configuration example of the switching power supply circuit of the present disclosure.

In the switching power supply circuit shown in FIG. 5, unlike the switching power supply circuits shown in FIGS. 1 through 4, switching elements 14a and 14b are used as the rectifying elements in place of the diodes 4a and 4b. The switching power supply circuit shown in FIG. 5 is formed of the switching elements 14a and 14b instead of the diodes 4a and 4b shown in FIG. 2. The switching elements 14a and 14b may be either typical switches or transistors such as MOSFETs (Metal Oxide Semiconductor Field Effect Transistors). Similarly, the switches 5a and 5b commonly used in the switching power supply circuits shown in FIGS. 1 through 5 may be either typical switches or transistors such as MOSFETs. For example, if the switching elements 14a and 14b and the switches 5a and 5b are formed of the same transistors such as MOSFETs, it is possible to realize a synchronous rectification method.

In this regard, the inductor 3a, the switch 5a, the switching element 14a and the capacitor 6a make up a positive voltage output circuit. The positive voltage output circuit serves as a voltage boosting circuit. On the other hand, the inductor 3b, the switch 5b, the switching element 14b and the capacitor 6b make up a negative voltage output circuit. The negative voltage output circuit serves as a voltage dropping circuit. The capacitor 2a, the capacitor 2b and the grounding point 10 as a junction of the capacitors 2a and 2b makes up an adder circuit. As is apparent from the above, the positive voltage output circuit and the negative voltage output circuit are symmetrical with each other in the arrangement and connection of circuit elements.

In the switching elements 14a and 14b, a reverse pulse signal RSW as a reversed version of the pulse signal SW may be used as a control signal. By doing so, the switching elements 14a and 14b come into an on-state when the switches 5a and 5b are opened. This makes it possible to charge an electric current having a unidirectional polarity to the capacitors 6a and 6b. Since forward voltages exist in the diodes 4a and 4b, voltage drop occurs in the configurations shown in FIGS. 1 through 4. In the configuration shown in FIG. 5, however, it is possible to neglect the voltage drop because the rectifying elements are made up of the switching elements 14a and 14b.

Figure 7:
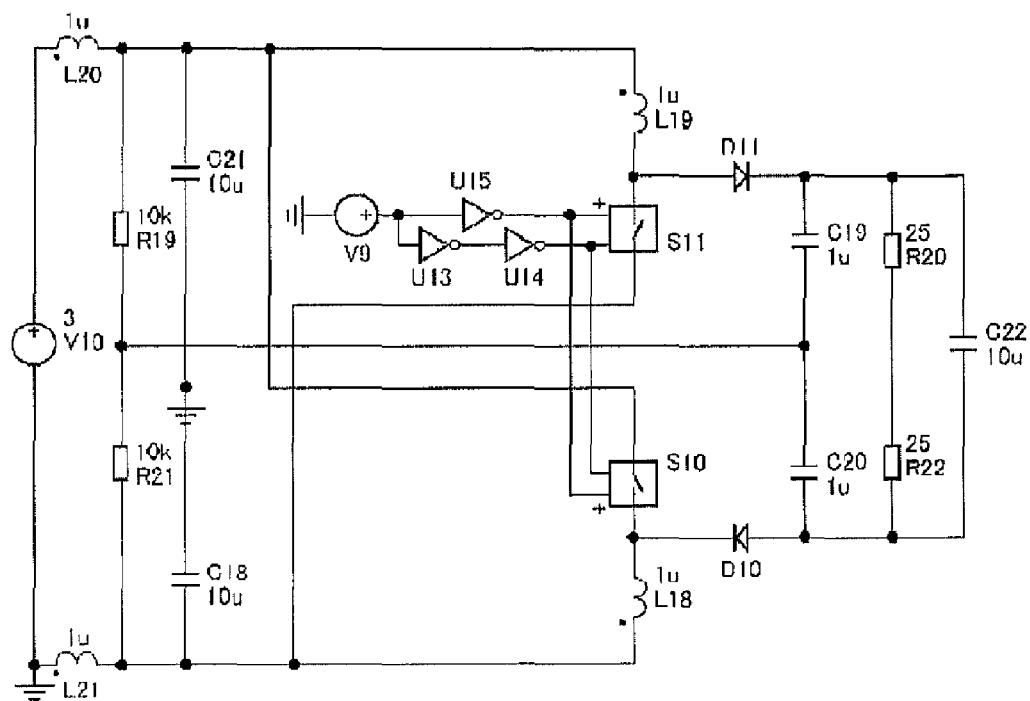
FIG. 7 is a circuit diagram of the switching power supply device of the present embodiment used in a simulation.
Figure 32A:
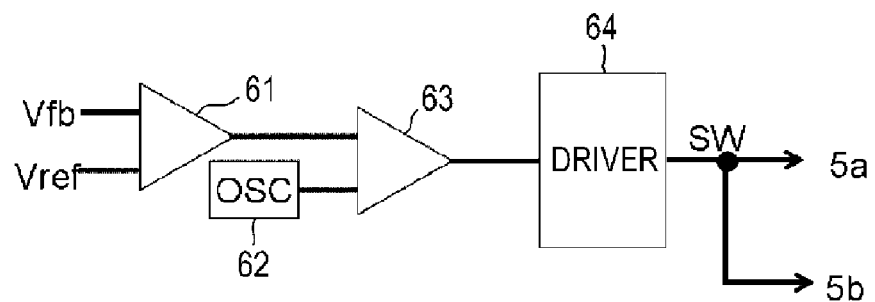
FIGS. 32A and 32B are circuit diagrams showing other examples of a PWM (pulse width modulation) circuit.
Figure 32B:
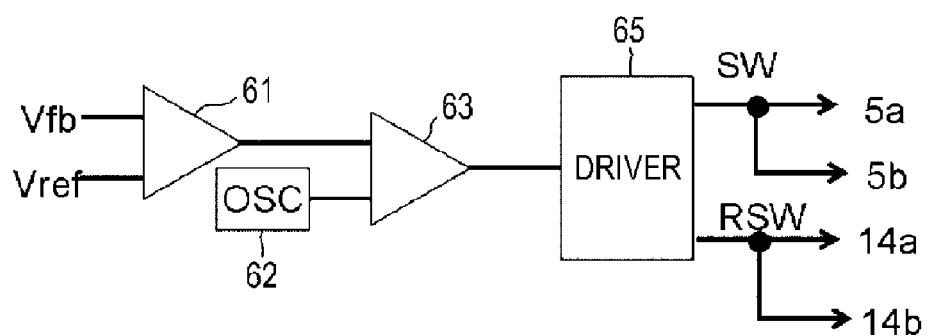

FIGS. 9 through 26 show the results of a simulation on the voltage and current of respective parts performed through the use of the switching power supply circuit shown in FIG. 4. A specific circuit used in the simulation is shown in FIG. 7. As can be seen from the correspondence relationship between FIG. 4 and FIG. 7, the direct-current power supply 1 corresponds to V10, the capacitors 2a and 2b to C21 and C18, the resistors 9a and 9b to R19 and R21, the inductor 3a to L20 and L19, the inductor 3b to L21 and L18, the switches 5a and 5b to S11 and S10, the diodes 4a and 4b to D11 and D10, the capacitors 6a and 6b to C19 and C20, the resistor 7 to R20 and R22 and the capacitor 8 to C22. U13, U14, U15 and V9 as a power supply, all of which exist in the central region, make up a PWM (pulse width modulation) circuit for generating a pulse signal SW. The PWM (pulse width modulation) circuit shown in FIG. 7 is one example and may be realized in other circuit configurations than that shown in FIG. 7. For example, FIGS. 32A and 32B are circuit diagrams showing other examples of a PWM (pulse width modulation) circuit. The PWM (pulse width modulation) circuit shown in FIG. 32A includes a differential amplifier 61 to which a feedback voltage Vfb corresponding to an output voltage and a reference voltage Vref are inputted, a comparator 63 to which the output of the differential amplifier 61 and the output of an oscillator 62 are inputted, and a driver circuit 64 to which the output of the comparator 63 is inputted. A pulse signal SW is outputted from the driver circuit 64. The PWM (pulse width modulation) circuit shown in FIG. 32B differs from the circuit shown in FIG. 32A in that a pulse signal SW and a reverse pulse signal RSW as a reversed version of the pulse signal SW are outputted from a driver circuit 65 through the use of a configuration corresponding to a synchronous rectification method. The numbers indicated near the reference numeral in FIG. 7 are the values of the circuit elements used in the simulation. For example, the power supply voltage of the direct-current power supply V10 is 3V and the capacitance of the capacitors C21 and C18 is 10 µF.

Figure 26A:
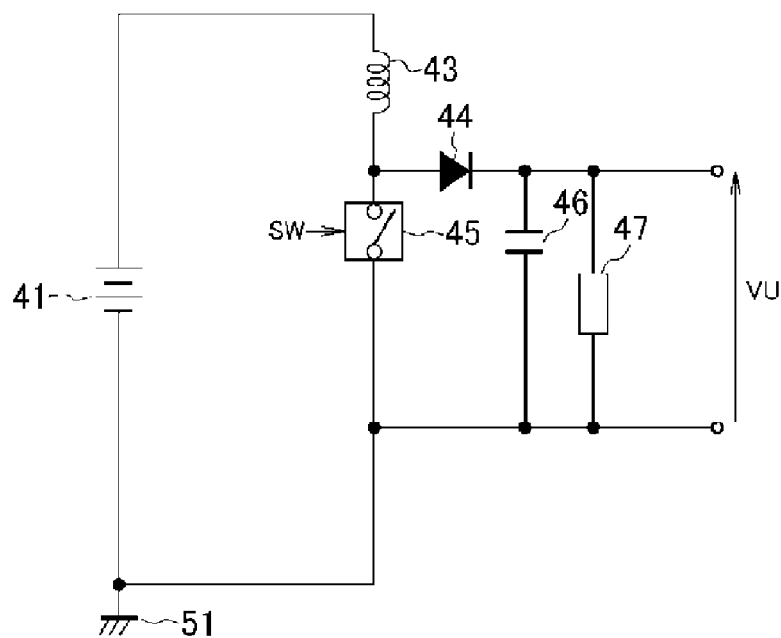
FIG. 26A is a view showing a circuit configuration of a switching power supply of the related art used in a simulation as a comparative example.
Figure 26B:
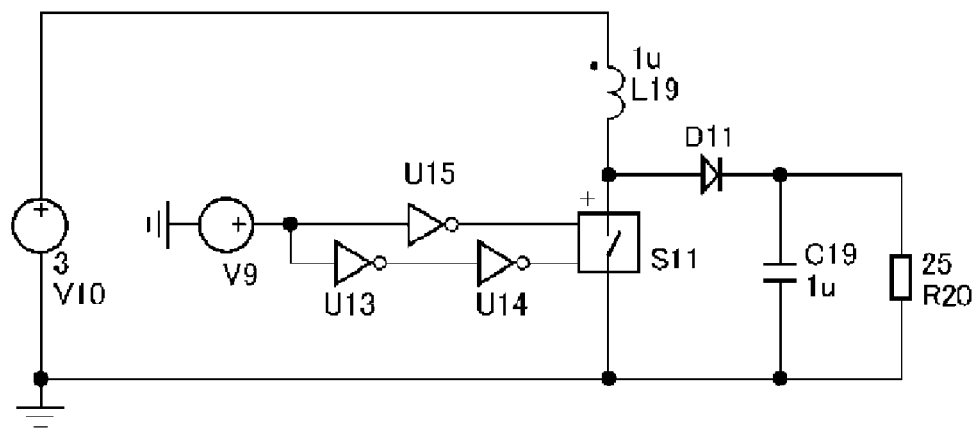
FIG. 26B is a view showing a specific circuit of the circuit configuration shown in FIG. 26A.

For the sake of comparison, the results of a circuit-simulation on the switching power sup ply of the related art are shown in FIGS. 27 through 31. The circuits used in this simulation are shown in FIGS. 26A and 26B. The circuits shown in FIGS. 26A and 26B are simpler than the circuits shown in FIGS. 4 and 8. FIG. 26A shows a circuit configuration. The circuit shown in FIG. 26A includes an inductor 43 and a switch 45, both of which are serially connected to a direct-current power supply 41. The circuit further includes a capacitor 46 and a resistor 47, both of which are connected in parallel to the switch 45. A diode 44 is connected between the switch 45 and the capacitor 46.

FIG. 26B shows a specific circuit of the circuit configuration shown in FIG. 26A. The direct-current power supply 41 corresponds to V10, the inductor 43 to L19, the switch 45 to S11, the diode 44 to D11, the capacitor 46 to C19 and the resistor 47 to R20. U13, U14, U15 and V9 as a power supply, all of which exist in the central region, make up one example of a PWM (pulse width modulation) circuit for generating a pulse signal SW. As indicated in FIG. 26B, the power supply voltage of the direct-current power supply 41 is 3V. The circuit shown in FIG. 26B is a so-called voltage boosting chopper type circuit that outputs a boosted voltage VU.

In the circuit-simulations stated above, the switching frequency, namely the frequency of the pulse signal SW, is set equal to 500 kHz. Calculations were performed under the assumption that the respective elements are ideal elements.

Figure 27:
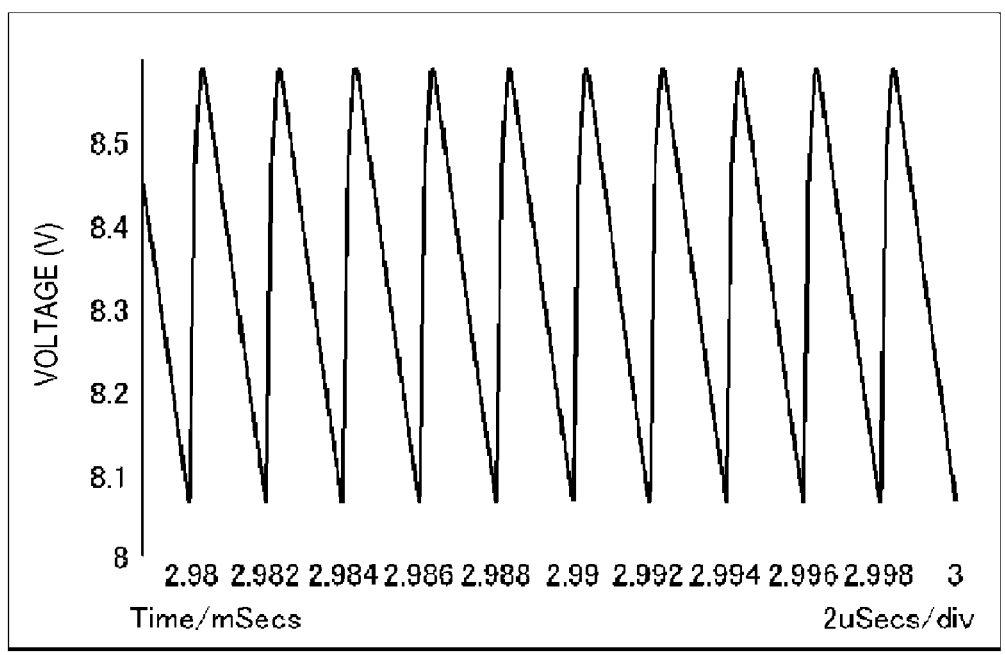
FIG. 27 is a view showing a boosted voltage output of the switching power supply shown in FIG. 26.

First, description will be made on the simulation results of the circuit shown in FIG. 26A. FIG. 27 shows a boosted voltage output VU. The vertical axis indicates the voltage (V) and the horizontal axis indicates the time (msec). The voltage fluctuates in a range of from about 8.1 V to about 8.6 V. The fluctuation band is large enough to exceed 0.5 V.

Figure 28:
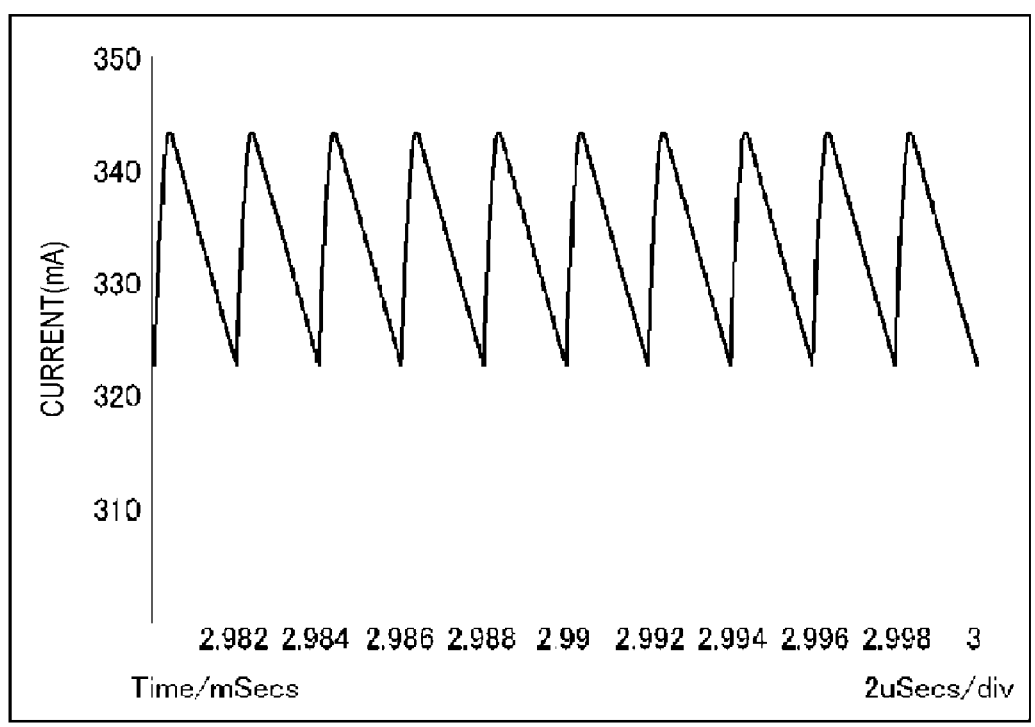
FIG. 28 is a view showing a load current.
Figure 29:
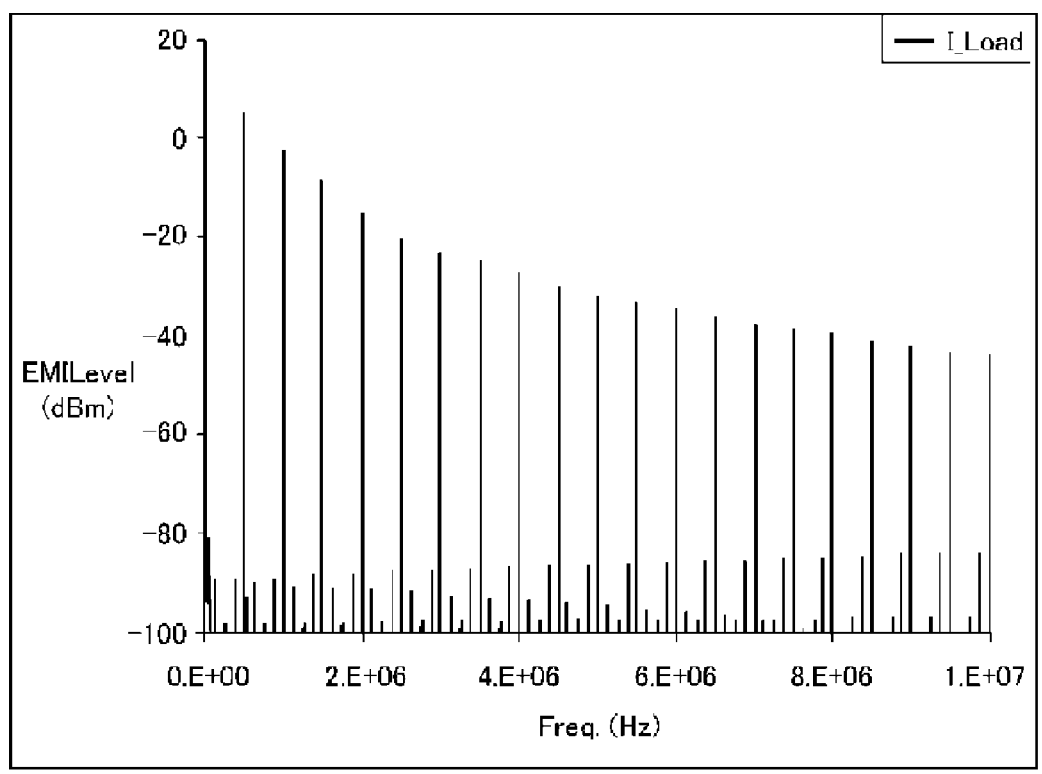
FIG. 29 is a view showing a frequency spectrum of the load current shown in FIG. 28.

FIG. 28 shows a load current flowing through the resistor 47. The vertical axis indicates the current (mA) and the horizontal axis indicates the time (msec). The load current fluctuates in a range of from about 320 mA to about 345 mA. The fluctuation band is large. FIG. 29 shows a frequency spectrum of the load current shown in FIG. 28. It can be seen that the harmonic component other than the fundamental wave has a relatively high intensity even though the harmonic component becomes a high-order harmonic.

Figure 30:
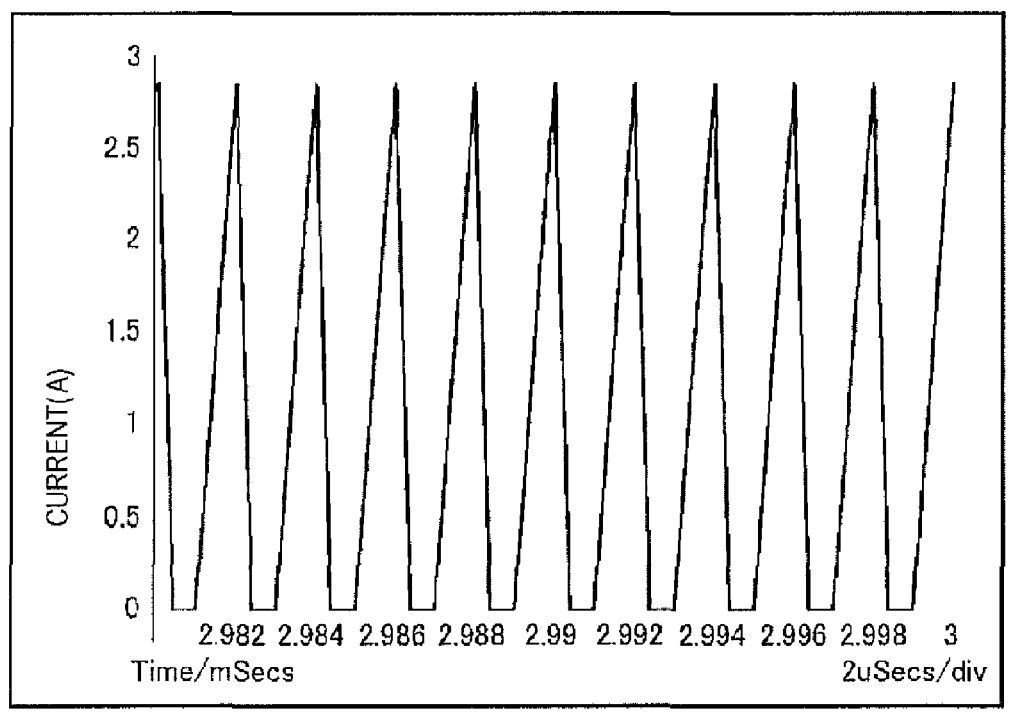
FIG. 30 is a view showing a direct-current power supply current.

FIG. 30 shows a power supply current flowing through the direct-current power supply 41. The vertical axis indicates the current (A) and the horizontal axis indicates the time (msec). The fluctuation band of the power supply current is quite large to reach 3 A. The run-out of the power supply current becomes a PI noise or an EMI noise. Noise is not generated if the fluctuation of the power supply current shown in FIG. 30 can be converted to a DC current through the use of a filter or the like. Since the magnitude of the fluctuation band is in the order of amperes, it is technically difficult to convert the fluctuation of the power supply current to a DC current even if a filter or the like is used.

Figure 31:
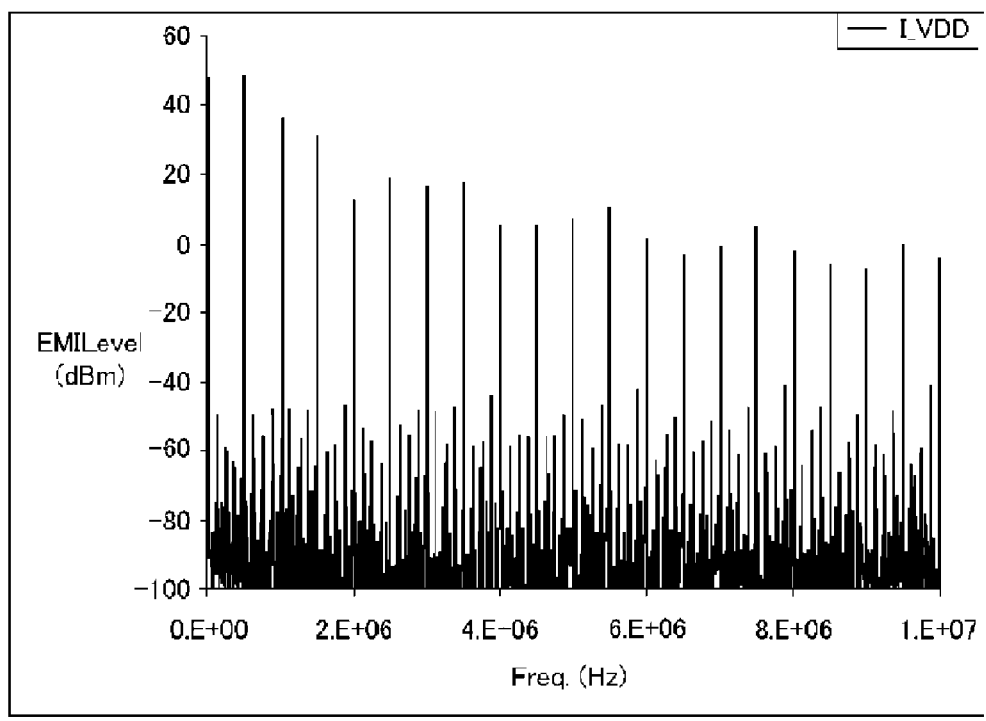
FIG. 31 is a view showing a frequency spectrum of the direct-current power supply current shown in FIG. 30.

FIG. 31 shows a frequency spectrum of the power supply current shown in FIG. 30. The fundamental wave has a magnitude of 49.3 dBm. The intensity of the harmonic component is distributed in an increased level.

Figure 8:
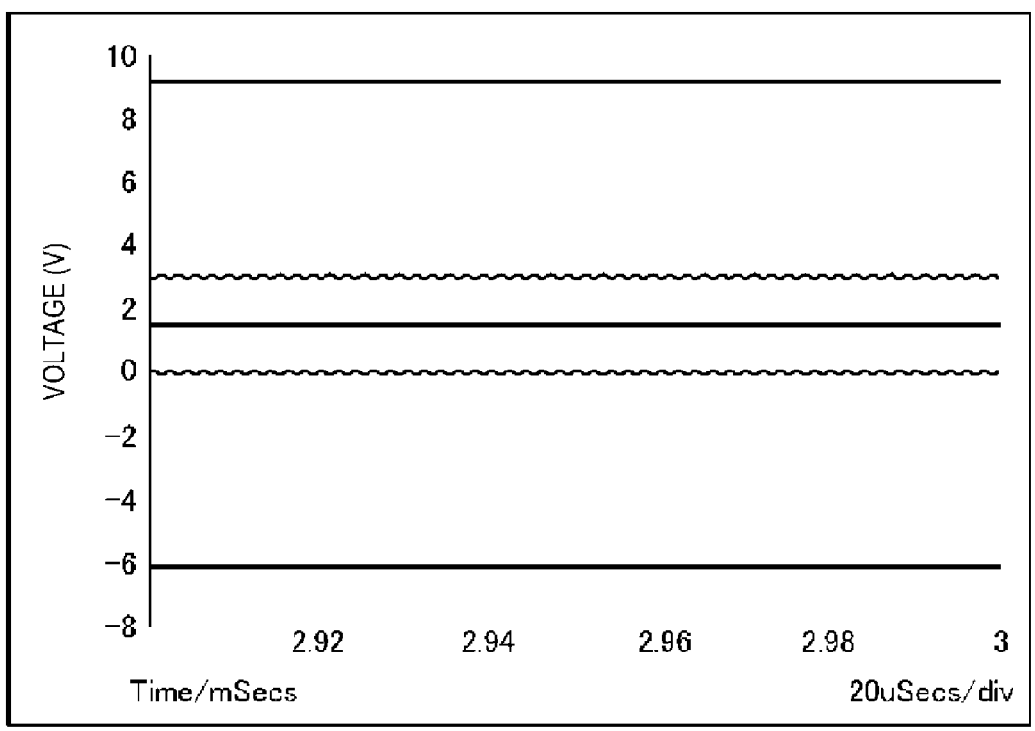
FIG. 8 is a view showing a boosted voltage, a direct-current supply voltage VDD, a voltage VDD/2, a ground voltage VSS and a dropped voltage.
Figure 9:
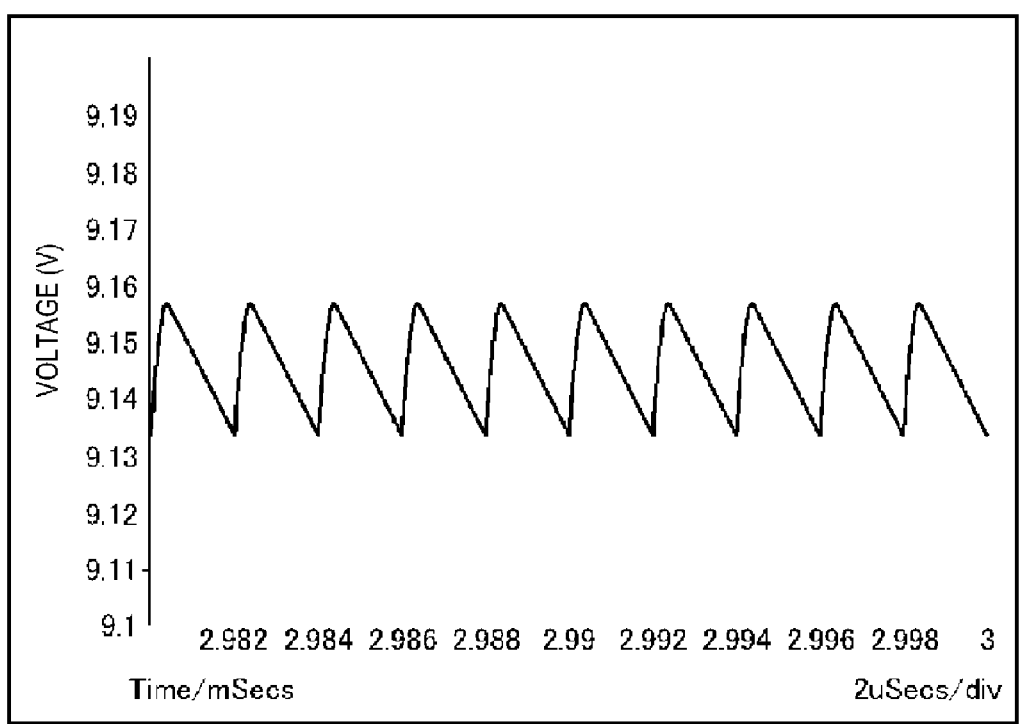
FIG. 9 is an enlarged view showing the boosted voltage among the curves shown in FIG. 8.

Next, description will be made on the simulation results with respect to the circuit configurations according to one embodiment of the present disclosure shown in FIGS. 4 and 7. FIG. 8 shows terminal voltages of respective parts. The boosted voltage Vp, the voltage VDD of the direct-current power supply 1, the voltage VDD/2, the voltage VL of the intermediate terminal of the inductor 3b and the dropped voltage Vn are shown in the named order from the upper side of the graph. FIG. 9 is an enlarged view of the boosted voltage Vp excerpted from the signals shown in FIG. 8. The boosted voltage Vp fluctuates between about 9.13 V and about 9.16 V.

Figure 10:
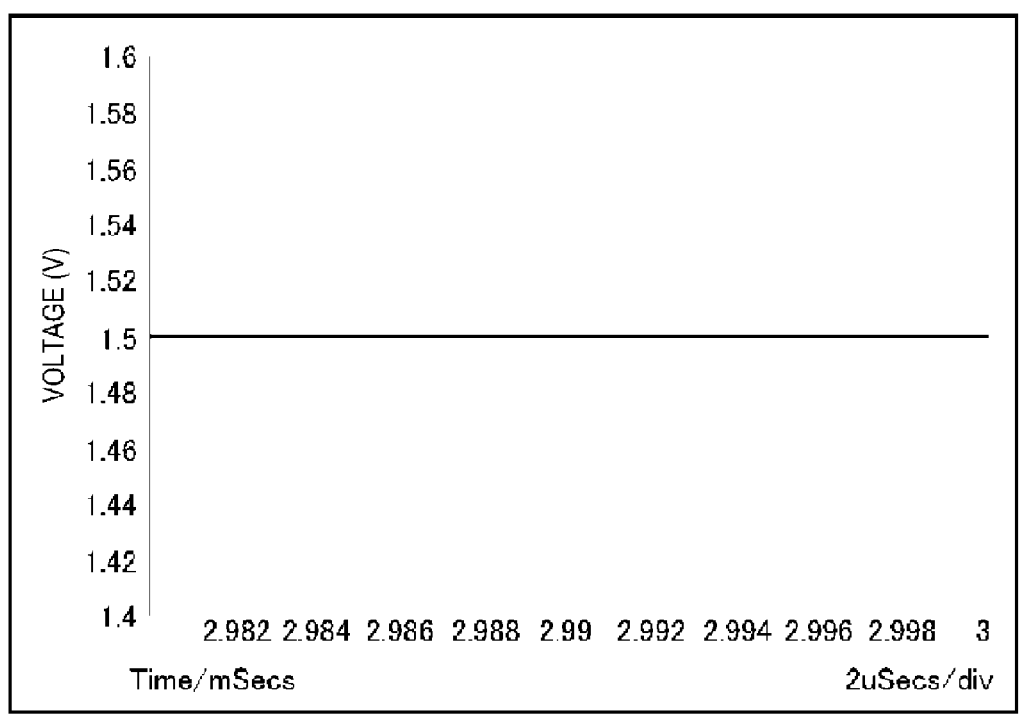
FIG. 10 is an enlarged view showing the voltage VDD/2 among the curves shown in FIG. 8.
Figure 11:
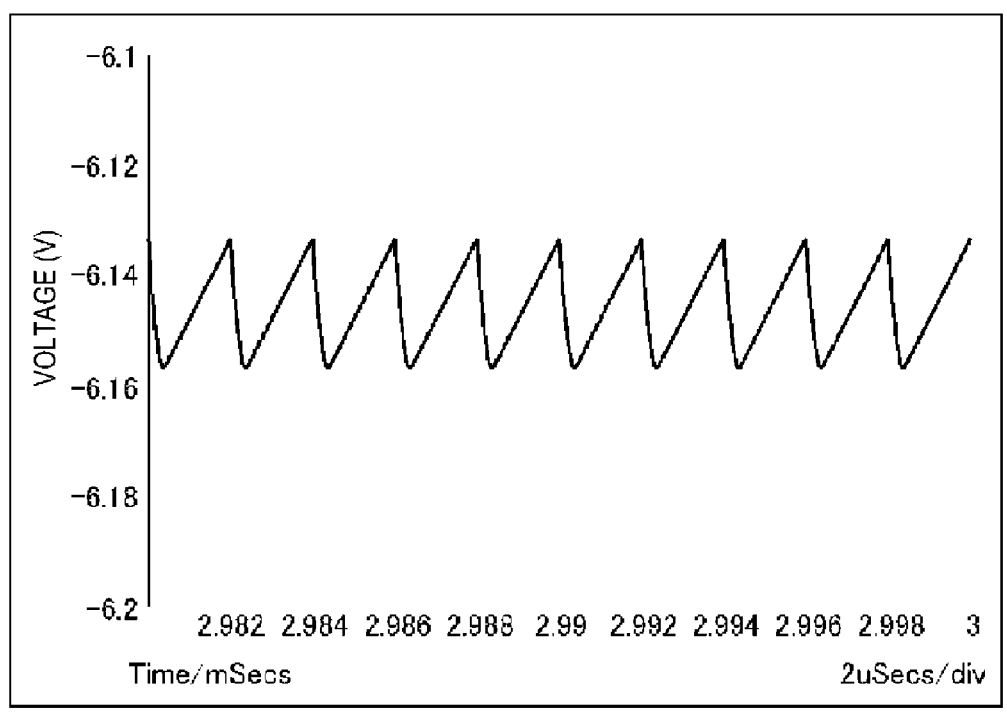
FIG. 11 is an enlarged view showing the dropped voltage among the curves shown in FIG. 8.
Figure 12:
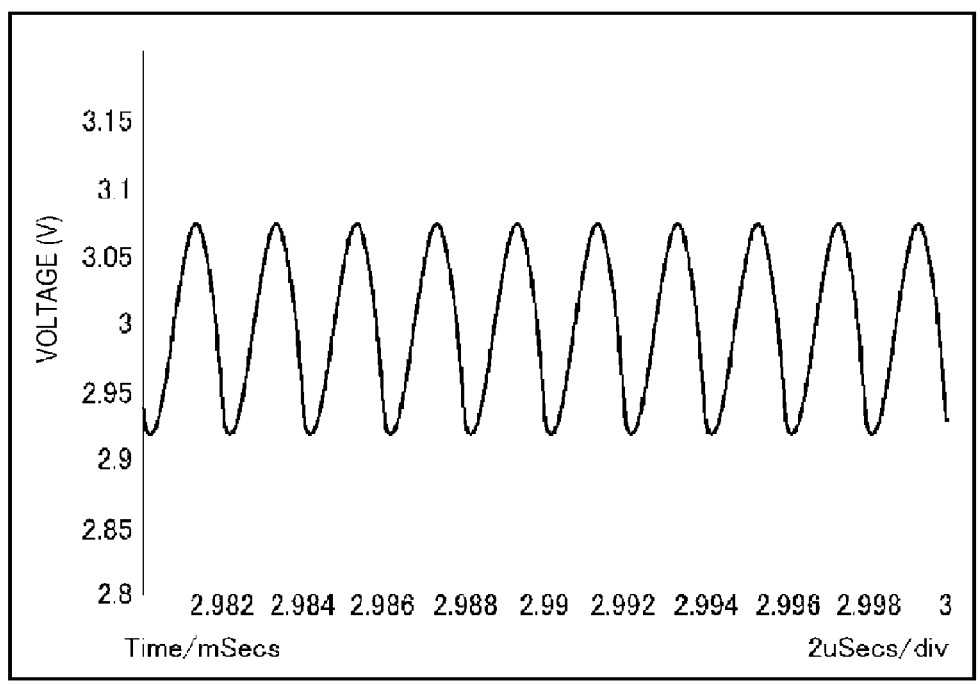
FIG. 12 is an enlarged view showing the voltage VDD among the curves shown in FIG. 8.

FIG. 10 shows the voltage VDD/2. Since the voltage VDD is 3 V, the voltage VDD/2 becomes 1.5 V. The voltage VDD/2 is flat. FIG. 11 shows the dropped voltage Vn which fluctuates between about −6.13 V and −6.16 V. FIG. 12 shows the VDD terminal voltage, namely the voltage waveform at the intermediate terminal of the inductor 3a. The VDD terminal voltage fluctuates within a range of about ±0.1 V from 3 V. In the circuit configuration of the related art shown in FIG. 26A, the fluctuation band of the boosted voltage output VU is so large as to exceed 0.5 V, as shown in FIG. 27. In the switching power supply device of the present embodiment, as stated above, the fluctuation band of the boosted voltage Vp and the dropped voltage Vn is as small as about 0.03 V.

Figure 13:
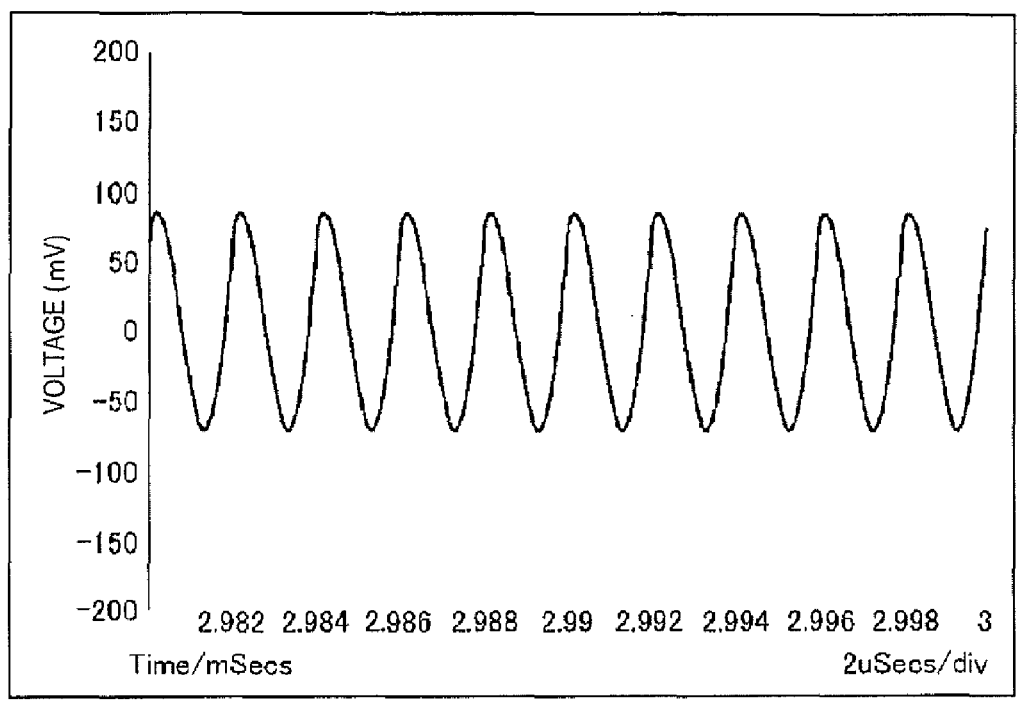
FIG. 13 is an enlarged view showing the voltage VSS among the curves shown in FIG. 8.
Figure 14:
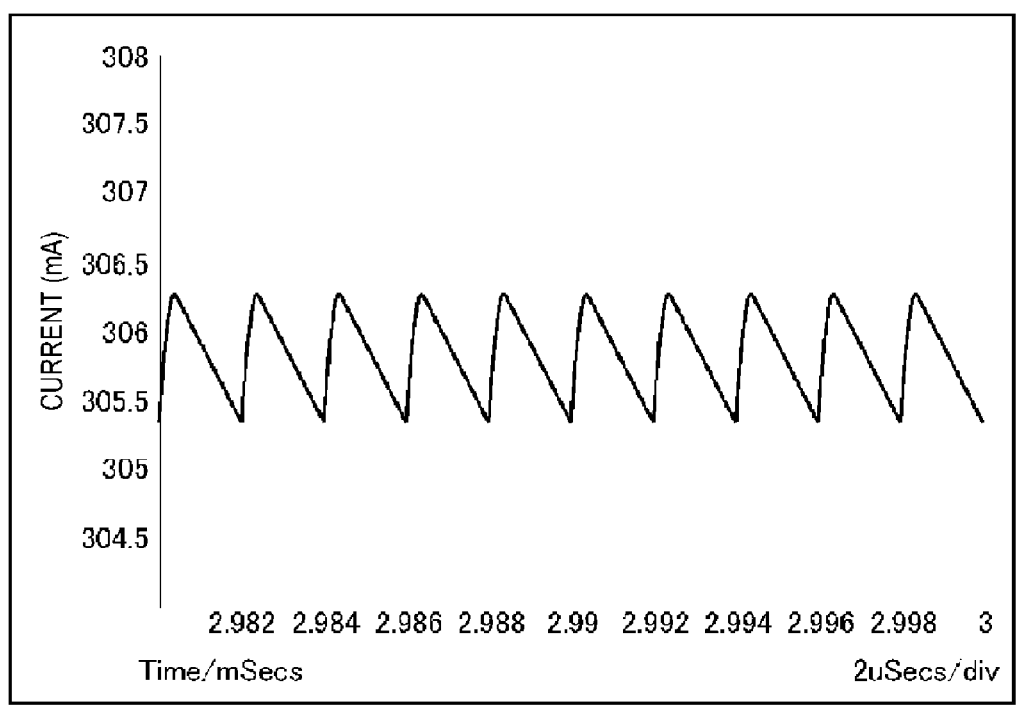
FIG. 14 is a view showing a load current IL.

FIG. 13 shows the VSS terminal voltage, namely the voltage waveform at the intermediate terminal of the inductor 3b. The VSS terminal voltage fluctuates within a range of about ±0.1 V from 0 V. FIG. 14 shows the electric current flowing through the resistor 7. The resistance value of the resistor 7 becomes 50Ω which is the total sum of the resistance values of R20 and R22. As set forth above, the load current flowing through the resistor 7 is represented by a formula IL=(Vp−Vn)/R. As shown in FIG. 14, the IL fluctuates within a range of from about 305.5 mA to about 306.5 mA with respect to the center point of about 306 mA.

Figure 15:
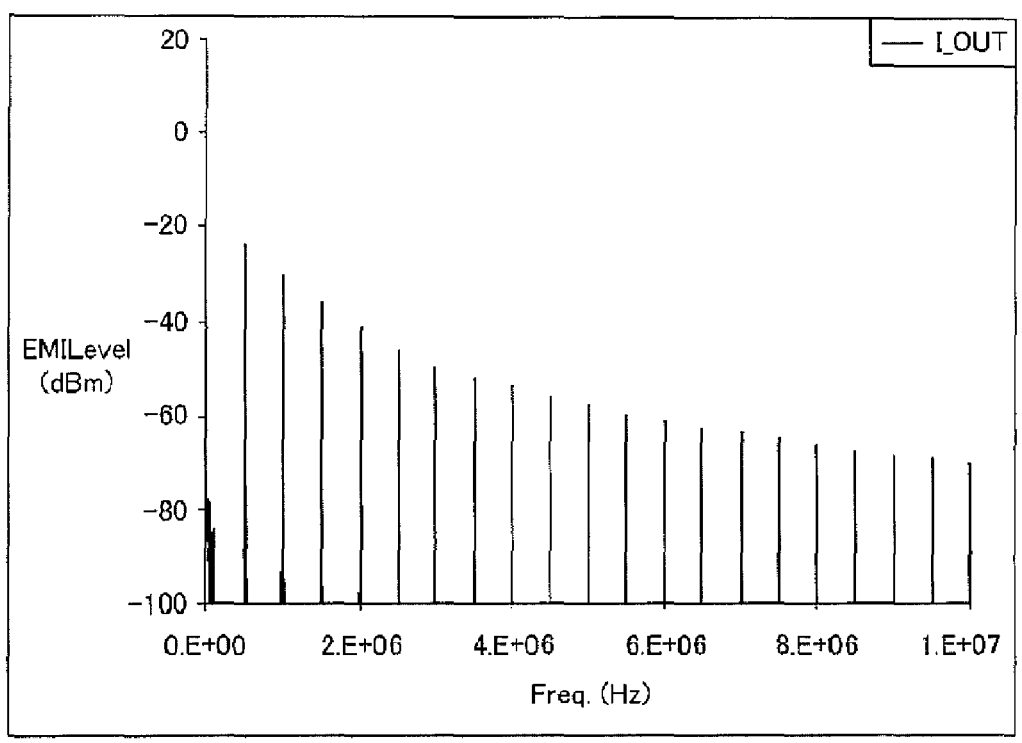
FIG. 15 is a view showing a frequency spectrum of the load current IL shown in FIG. 14.
Figure 16:
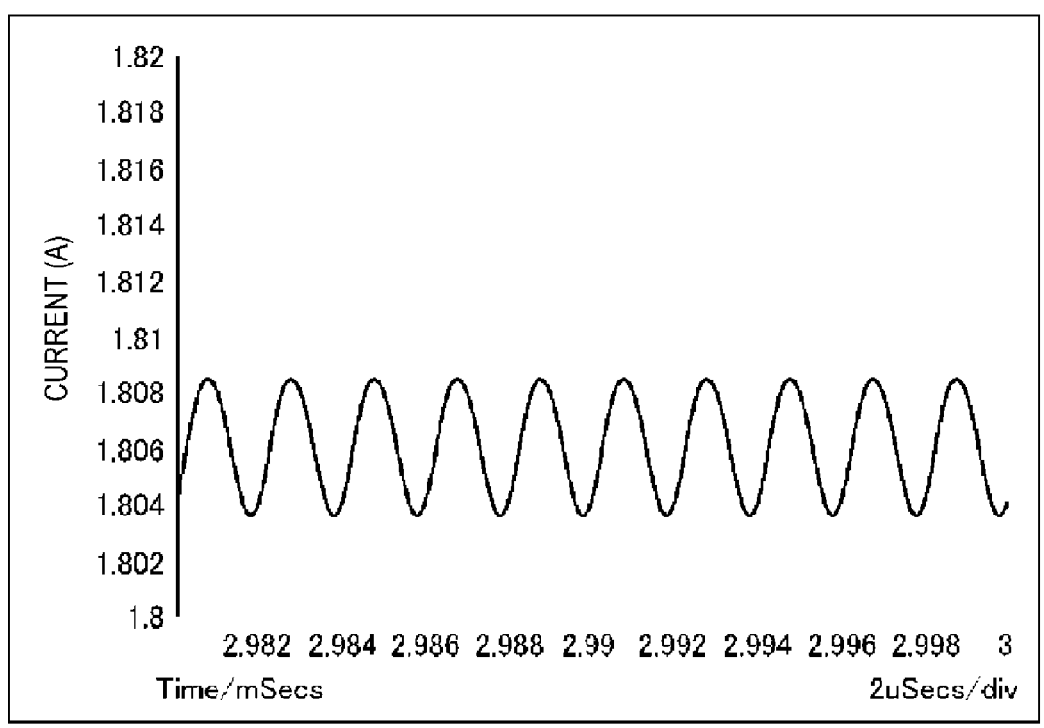
FIG. 16 is a view showing a direct-current power supply current IDD.
Figure 17:
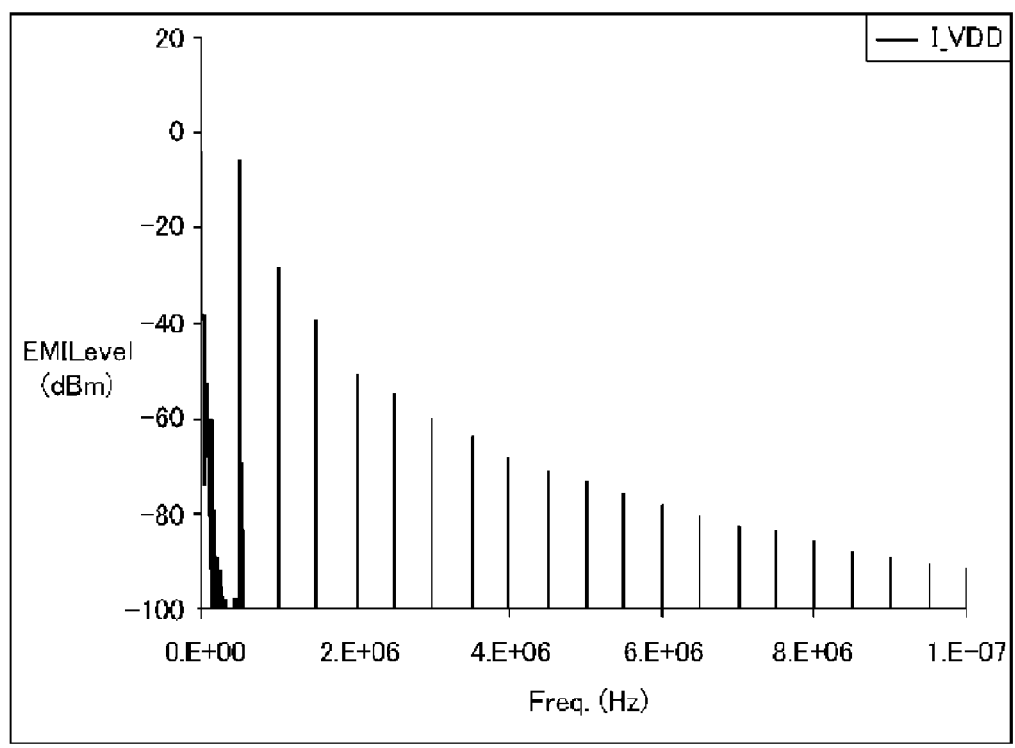
FIG. 17 is a view showing a frequency spectrum of the direct-current power supply current IDD shown in FIG. 16.

FIG. 15 shows the frequency spectrum of the load current IL shown in FIG. 14. The horizontal axis indicates the frequency and the vertical axis indicates the EMI noise level (dBm). The fundamental wave is −23.2 dBm. FIG. 16 shows the power supply current IDD flowing through the direct-current power supply 1. The power supply current IDD fluctuates within a range of from 1.804 A to 1.808 A with respect to the center point of 1.806 A. FIG. 17 shows the frequency component of the power supply current IDD shown in FIG. 16. The horizontal axis indicates the frequency and the vertical axis indicates the EMI noise level (dBm). The fundamental wave is −5.3 dBm.

In the circuit configuration of the related art shown in FIG. 26A, the load current fluctuates between about 320 mA and about 345 mA, as shown in FIG. 28. In the switching power supply device of the present embodiment, the fluctuation band of the load current remains within a range of about 1.0 mA or less and, therefore, is kept very small. In the circuit configuration of the related art shown in FIG. 26A, the harmonic component other than the fundamental wave in the frequency spectrum of the load current has a higher intensity, as shown in FIG. 29, even though the harmonic component becomes a high-order harmonic. In the switching power supply device of the present embodiment, however, the high-order harmonic component is kept at a low level a shown in FIG. 15.

In the circuit configuration of the related art shown in FIG. 26A, the fluctuation band of the power supply current is as large as 3 A as shown in FIG. 30. As shown in FIG. 31, the intensity of the harmonic component of the power supply current is distributed at an increased level. In the switching power supply device of the present embodiment, as shown in FIG. 16, the fluctuation band of the power supply current IDD remains as small as 0.005 A and, therefore, is kept very small. As shown in FIG. 17, the harmonic component of the power supply current IDD becomes very small.

Figure 18:
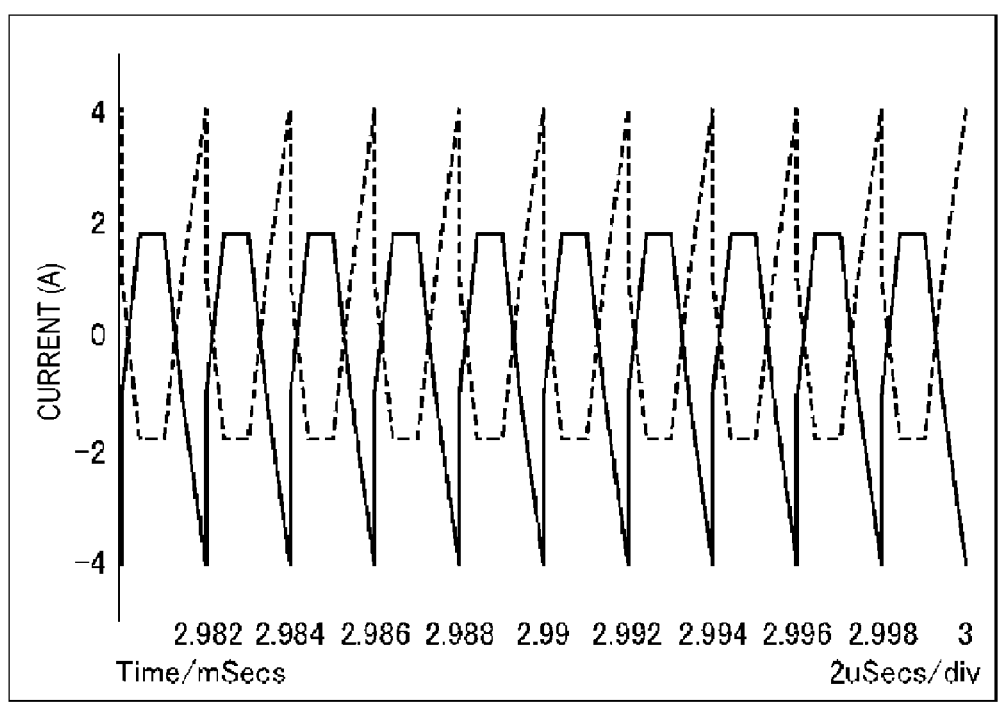
FIG. 18 is a view showing an electric current flowing through a capacitor of an adder circuit.
Figure 19:
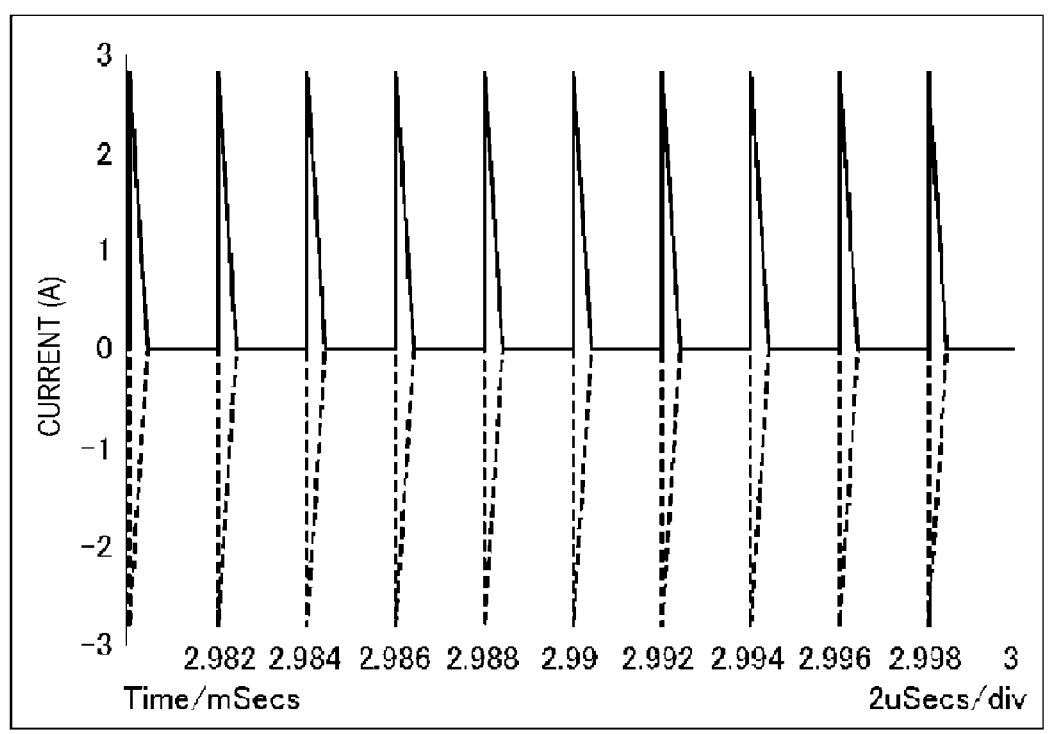
FIG. 19 is a view showing an electric current flowing through a rectifying element.

FIG. 18 shows the electric current flowing through the capacitors 2a and 2b. The dotted line curve indicates the electric current flowing through the capacitor 2a. The solid line curve indicates the electric current flowing through the capacitor 2b. FIG. 19 shows the electric current flowing through the diodes 4a and 4b. The solid line curve indicates the electric current flowing through the diode 4a. The dotted line curve indicates the electric current flowing through the diode 4b.

Two kinds of positive and negative switching currents shown in FIGS. 18 and 19 are added through the capacitors 2a and 2b, thus becoming approximately zero. As a result, the power supply current IDD is smoothed as shown in FIG. 16. Description will now be made on the voltage waveform and the current waveform at the current confluence point P where two kinds of positive and negative switching currents shown in FIGS. 18 and 19 are added through the capacitors 2*a* and 2*b*.

Figure 20:
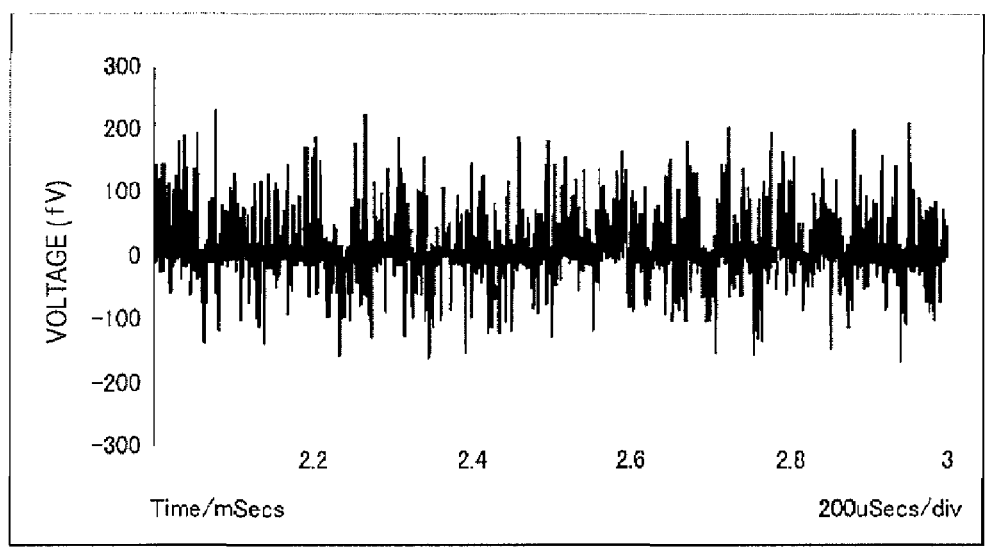
FIG. 20 is a view showing a transient voltage at point P.
Figure 21:
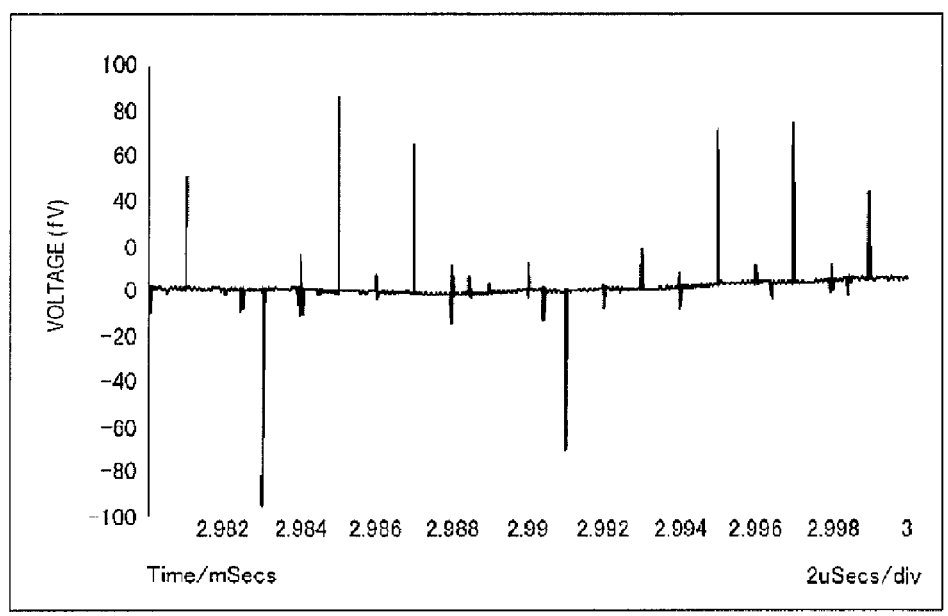
FIG. 21 is a partially enlarged view of the transient voltage shown in FIG. 20.

FIG. 20 shows the stabilized waveform of the transient voltage waveform at the current confluence point P. The stabilized waveform is a voltage waveform available after 2 ms to 3 ms has lapsed. The vertical axis indicates the voltage (fV) and the horizontal axis indicates the time (msec). It can be noted from the voltage waveform that the noises are nearly cancelled. FIG. 21 is an enlarged view showing the range of from 2.98 ms to 3 ms in the graph shown in FIG. 20. As can be seen in FIG. 21, there exist impulse-type whisker-like noises. However, it can be appreciated that most of the noises are partially flat in this voltage level.

Figure 22:
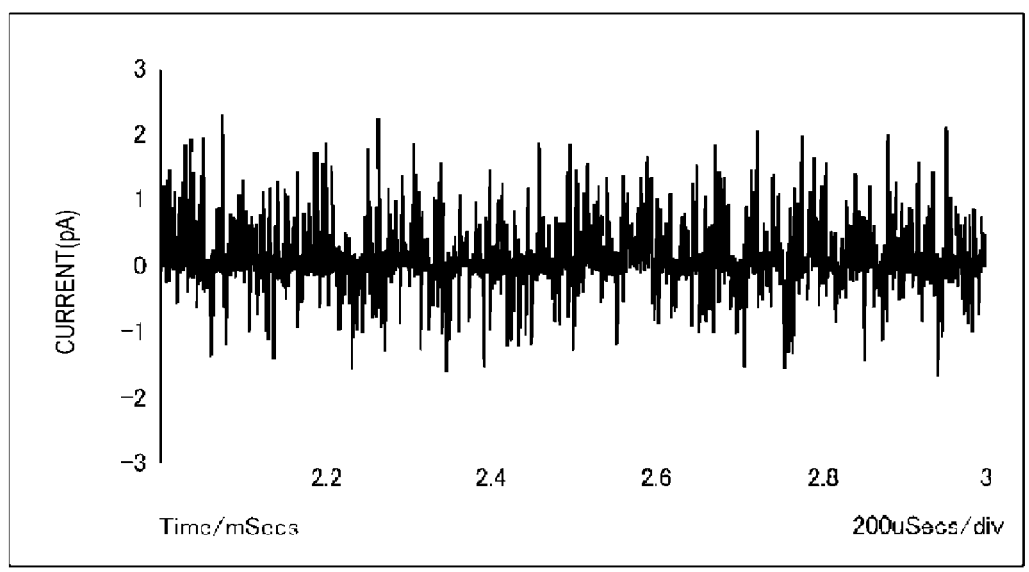
FIG. 22 is a view showing a transient current at point P.
Figure 23:
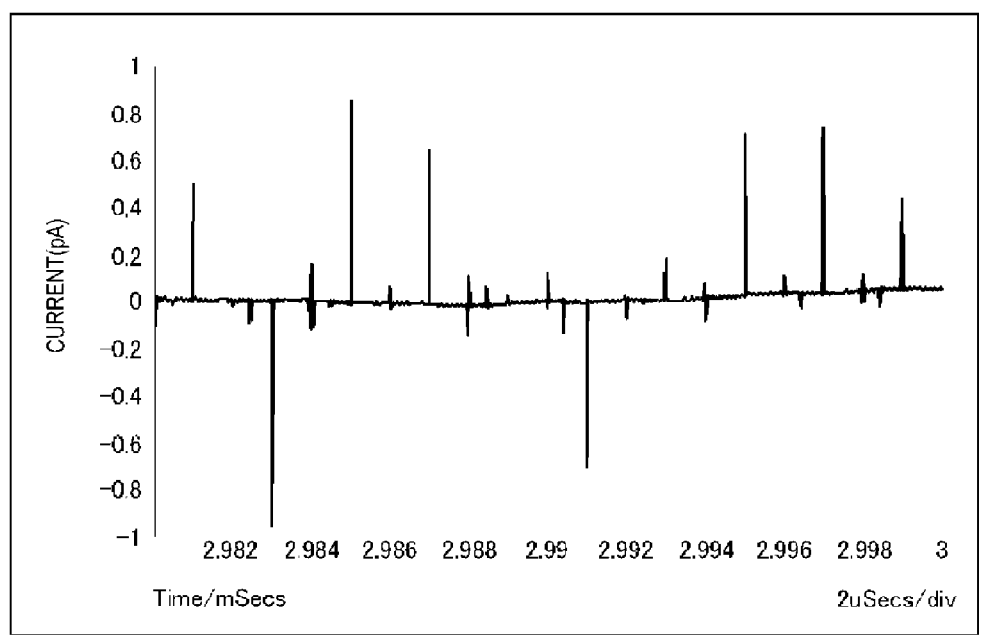
FIG. 23 is a partially enlarged view of the transient current shown in FIG. 22.

FIG. 22 shows the stabilized current waveform (after 2 ms to 3 ms) of the transient current waveform at the current confluence point P. The vertical axis indicates the current (pA) and the horizontal axis indicates the time (msec). Just like the transient voltage, FIG. 23 is an enlarged view showing the range of from 2.98 ms to 3 ms in the graph shown in FIG. 22. As can be seen in FIG. 23, there exist impulse-type whisker-like noises. However, it can be appreciated that most of the noises are partially flat in this current level.

Figure 24:
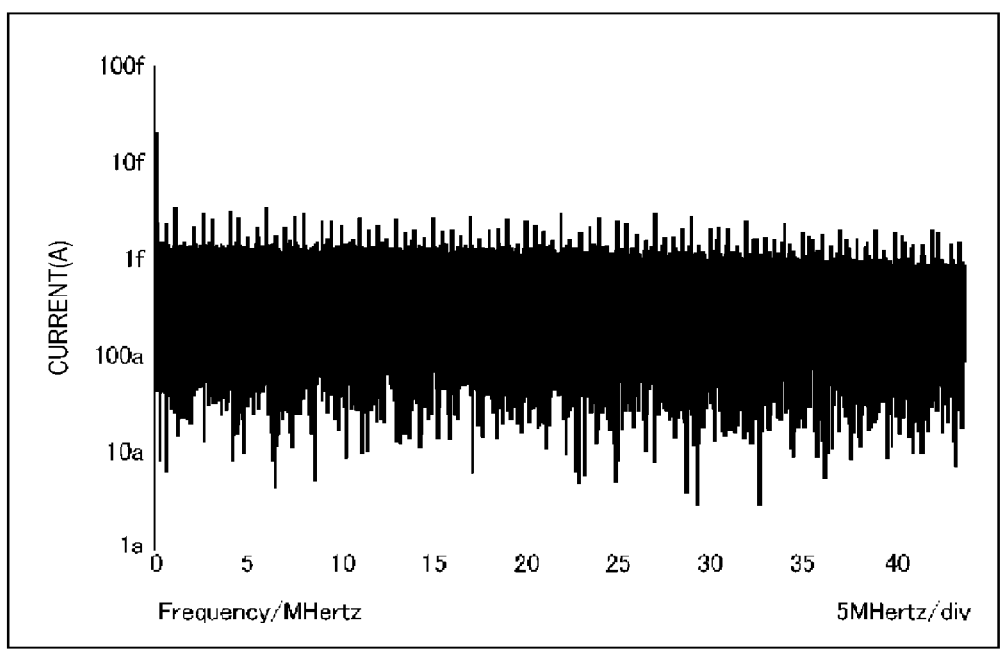
FIG. 24 is a view showing a frequency spectrum of the transient current shown in FIG. 22.
Figure 25:
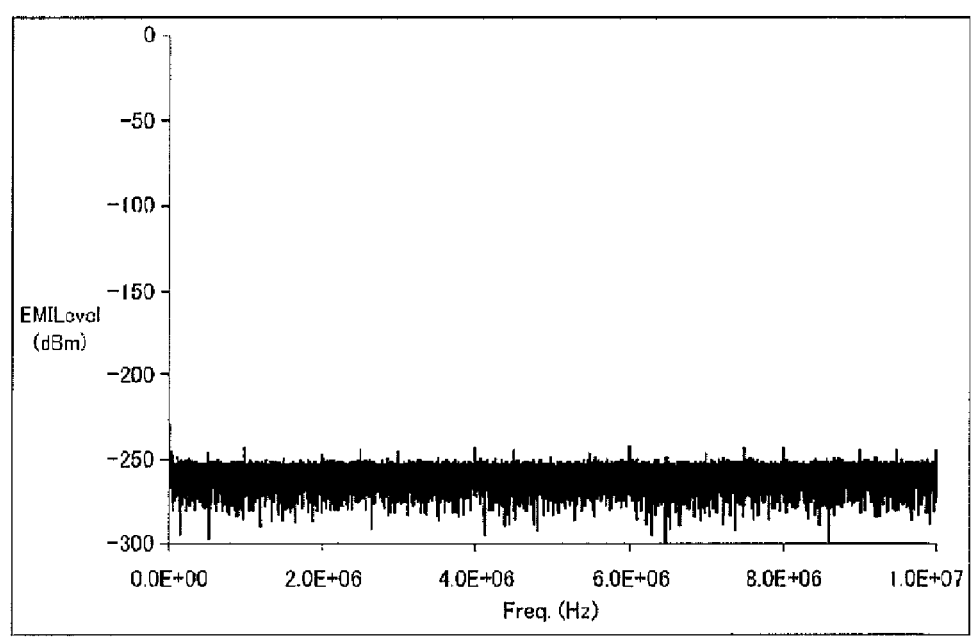
FIG. 25 is another view showing a frequency spectrum of the transient current shown in FIG. 22.

FIG. 24 shows the FFT (Fast Fourier Transform)-converted frequency spectrum of the transient current waveform at the current confluence point P. The vertical axis indicates the current (A) and the horizontal axis indicates the frequency (MHz). Similarly, FIG. 25 shows the FFT(Fast Fourier Transform)-converted frequency spectrum of the transient current waveform at the current confluence point P. The vertical axis indicates the EMI noise level (dBm) and the horizontal axis indicates the frequency. As can be noted in FIGS. 24 and 25, the noises are particularly effectively reduced at the current confluence point P.

Since the capacitor 2*a* and the inductor 3*a* make up a T-type LC filter and the capacitor 2*b* and the inductor 3*b* make up a T-type LC filter, the remaining noises become similar to a minute sinusoidal wave with the aid of an attenuating effect provided by the T-type LC filters. Consequently, as shown in FIG. 17, the fundamental wave component is highest in level, and the intensity is sharply reduced as the harmonic component becomes higher in order. It therefore can be noted that the intensity of the entire harmonic components becomes smaller. Inasmuch as the output of 15.3 V and 0.305 A is obtained from the input of 3 V and 1.81 A, the input/output efficiency becomes 85.9% as represented by a formula:

$$\text{efficiency} = (15.3 \text{ V} \times 0.305 \text{ A})/(3 \text{ V} \times 1.81 \text{ A}) = 85.9\% \quad (4).$$

The loss of efficiency is attributable to the voltage drop in the diodes 4*a* and 4*b*. As described above, the foregoing embodiment makes it possible to realize, using the simple configuration, a switching power supply device with a noise cancelling function which is capable of obtaining a positive voltage output and a negative voltage output while keeping the efficiency high and capable of sharply reducing the switching noises.

The switching power supply device according to the embodiment of the present disclosure can be used as a power supply of a wireless communication unit for processing ultrafine signals, such as Bluetooth, GPS (Global Positioning system) or WLAN (Wireless Local Area Network). In addition, the switching power supply device according to the embodiment of the present disclosure can be used as a power supply in a device in which an erroneous operation may be generated by a small PI or EMI noise.

The switching power supply device according to the embodiment of the present disclosure includes the positive voltage output circuit and the negative voltage output circuit, both of which are connected to the direct-current power supply. The arrangement or connection of the circuit elements such as the switching elements, the inductors, the rectifying elements and the capacitors in the positive voltage output circuit is symmetrical with that in the negative voltage output circuit. Thus, the magnitudes of the PI and EMI noises generated by the switching operation in the positive voltage output circuit and the negative voltage output circuit are substantially equal to each other. Accordingly, the switching noises can be made extremely small by adding the reversely generated currents containing the PI and EMI noises through the use of the adder circuit.

The noise-cancelling adder circuit does not make use of special parts such as a filter or a choke coil. It is only necessary to add the currents extracted from the positive voltage output circuit and the negative voltage output circuit, both of which are needed to output voltages. Therefore, as compared with the related art, the switching power supply device according to the embodiment of the present disclosure becomes simpler, smaller in volume and weight, lower in price and higher in reliability.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switching power supply device, comprising: a positive voltage output circuit connected to a direct-current power supply, the positive voltage output circuit including a first switching element that is switched on and off by a switching control signal, a voltage boosting inductor, a first rectifying element and a first capacitor; a negative voltage output circuit connected to the direct-current power supply, the negative voltage output circuit including a second switching element that is switched on and off by the switching control signal, a voltage dropping inductor, a second rectifying element and a second capacitor; and an adder circuit configured to add switching currents flowing when the first switching element and the second switching element are operated, wherein the switching control signal is input to the first and second switching elements such that the first and second switching elements are switched on and off together, wherein the first switching element, the voltage boosting inductor, the first rectifying element and the first capacitor of the positive voltage output circuit are in a symmetrical arrangement with the second switching element, the voltage dropping inductor, the second rectifying element and the second capacitor of the negative voltage output circuit, and the positive voltage output circuit is configured to generate a first switching current and the negative voltage output circuit is configured to generate a second switching current, wherein the first switching current of the positive voltage output circuit and the second switching current of the negative voltage output circuit are generated in mutually opposite directions and inputted to the adder circuit, and wherein one terminal of the first switching element is connected to a midpoint of the voltage dropping inductor, and one terminal of the second switching element is connected to a midpoint of the voltage boosting inductor, and wherein the voltage boosting inductor and the voltage dropping inductor are center-tap inductors, wherein a third capacitor is provided between the midpoint of the voltage boosting inductor and a grounding point, and a fourth capacitor is provided between the midpoint of the voltage dropping inductor and the grounding point, and wherein a third switching element is provided between one end of the voltage boosting inductor and the midpoint of the voltage dropping inductor, and a fourth switching element is provided between one end of the voltage dropping inductor and the midpoint of the voltage boosting inductor.

2. The device of claim 1, wherein the positive voltage output circuit and the negative voltage output circuit are configured to operate at one half of a voltage of the direct-current power supply.

3. The device of claim 2, wherein the first switching element and the second switching element are serially connected to each other at a connection point, the connection point kept at one half of the voltage of the direct-current power supply.

4. The device of claim 2, wherein the first switching element and the second switching element are parallel to the direct-current power supply.

5. The device of claim 1, wherein the positive voltage output circuit and the negative voltage output circuit are configured to operate at a voltage obtained by dividing a voltage of the direct-current power supply.

6. The device of claim 5, wherein the first switching element and the second switching element are serially connected to each other at a connection point, the connection point kept at one half of the voltage of the direct-current power supply.

7. The device of claim 5, wherein the first switching element and the second switching element are parallel to the direct-current power supply.

8. The device of claim 1, wherein the adder circuit includes a third capacitor through which the first switching current generated from the positive voltage output circuit flows and a fourth capacitor through which the second switching current generated from the negative voltage output circuit flows.

9. The device of claim 1, wherein the first rectifying element and the second rectifying element are formed of switching elements.

10. The device of claim 1, wherein the voltage boosting inductor and the voltage dropping inductor are formed of center-tap inductors.

11. The device of claim 1, wherein the adder circuit includes a third capacitor provided between a center of the voltage boosting inductor and a fourth capacitor provided between a center of the dropping inductor and a grounding point.

12. The device of claim 1, wherein the positive voltage output circuit further includes a first resistor, and the negative voltage output circuit further includes a second resistor, and
wherein a voltage of the direct-current power supply is divided by the first and second resistors to become one half of the voltage of the direct-current power supply, and the one half of the voltage is respectively supplied to the first and second switching elements.

13. A switching power supply device, comprising:
a positive voltage output circuit connected to a direct-current power supply, the positive voltage output circuit including a first switching element that is switched on and off by a switching control signal, a voltage boosting inductor as a center-tap inductor, a first rectifying element and a first capacitor;
a negative voltage output circuit connected to the direct-current power supply, the negative voltage output circuit including a second switching element that is switched on and off by the switching control signal, a voltage dropping inductor as a center-tap inductor, a second rectifying element and a second capacitor; and
an adder circuit configured to add switching currents flowing when the first switching element and the second switching element are operated,
wherein the switching control signal is input to the first and second switching elements such that the first and second switching elements are switched on and off together,
wherein the first switching element, the voltage boosting inductor, the first rectifying element and the first capacitor of the positive voltage output circuit are in a symmetrical arrangement with the second switching element, the voltage dropping inductor, the second rectifying element and the second capacitor of the negative voltage output circuit, and the positive voltage output circuit is configured to generate a first switching current and the negative voltage output circuit is configured to generate a second switching current, and
wherein the first switching current of the positive voltage output circuit and the second switching current of the negative voltage output circuit are generated in mutually opposite directions and inputted to the adder circuit,
wherein a third capacitor is provided between a midpoint of the voltage boosting inductor and a grounding point, and a fourth capacitor is provided between a midpoint of the voltage dropping inductor and the grounding point,
wherein a first resistor and a second resistor is provided in parallel between the midpoint of the voltage boosting inductor and the midpoint of the voltage dropping inductor, and
wherein a first point between the first and second resistors is connected to a second point between the first and second switching elements.

14. The device of claim 13, wherein the first rectifying element and the second rectifying element are formed of switching elements.

15. The device of claim 14, wherein a voltage of the direct-current power supply is divided by the first and second resistors to become one half of the voltage of the direct-current power supply, and the one half of the voltage is respectively supplied to the first and second switching elements.

* * * * *